United States Patent
Hashimoto et al.

(10) Patent No.: US 11,977,365 B2
(45) Date of Patent: May 7, 2024

(54) SKILL TRANSFER MECHANICAL APPARATUS

(71) Applicant: KAWASAKI JUKOGYO KABUSHIKI KAISHA, Kobe (JP)

(72) Inventors: Yasuhiko Hashimoto, Kobe (JP); Nobuyasu Shimomura, Kobe (JP); Masayuki Kamon, Akashi (JP); Shigetsugu Tanaka, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 494 days.

(21) Appl. No.: 16/767,984

(22) PCT Filed: Nov. 28, 2018

(86) PCT No.: PCT/JP2018/043876
§ 371 (c)(1),
(2) Date: May 28, 2020

(87) PCT Pub. No.: WO2019/107454
PCT Pub. Date: Jun. 6, 2019

(65) Prior Publication Data
US 2021/0003993 A1    Jan. 7, 2021

(30) Foreign Application Priority Data
Nov. 28, 2017 (JP) .................. 2017-228418

(51) Int. Cl.
*G05B 19/4155*    (2006.01)
*G06N 20/00*    (2019.01)

(52) U.S. Cl.
CPC ......... *G05B 19/4155* (2013.01); *G06N 20/00* (2019.01); *G05B 2219/39338* (2013.01)

(58) Field of Classification Search
None
See application file for complete search history.

(56) References Cited

U.S. PATENT DOCUMENTS 6,496,756 B1    12/2002    Nishizawa et al.
2007/0150100 A1*    6/2007    Saraliev .................. H01L 21/68
700/245

(Continued)

FOREIGN PATENT DOCUMENTS

CN    WO 2007/039785 A1 *    4/2007    ........... H01H 3/0253
JP    2009-211294 A    9/2009

(Continued)

OTHER PUBLICATIONS

Peternel et al., "A Shared Control Method for Online Human-in-the-Loop Robot Learning Based on Locally Weighted Regression," 2016 IEEE/RSJ International Conference on Intelligent Robots and Systes (IROS), Oct. 9-14, 2016, pp. 3900-3906.

(Continued)

*Primary Examiner* — Charles E Anya
(74) *Attorney, Agent, or Firm* — Oliff PLC

(57) ABSTRACT

A skill transfer mechanical apparatus includes an operating part, a controller, a motion information detector and an operation apparatus. The controller includes a basic motion instructing module, a learning module, a motion correcting instruction generator, a motion correcting instruction, and a motion information storing module. The learning module carries out machine learning of the motion correcting instruction stored in the motion correcting instruction storing module by using the motion information stored in the motion information storing module, and after the machine learning is finished, accepts an input of the motion information during the operation of the operating part, and outputs the automatic motion correcting instruction. The operating part moves the working part according to an automatic motion instruction based on the basic motion instruction and the automatic motion correcting instruction, and the manual motion correction.

15 Claims, 18 Drawing Sheets

(56) References Cited

U.S. PATENT DOCUMENTS

| | | | |
|---|---|---|---|
| 2010/0286826 A1 | 11/2010 | Tsusaka et al. | |
| 2013/0218340 A1 | 8/2013 | Hager et al. | |
| 2015/0217449 A1* | 8/2015 | Meier | G05D 1/0088 901/1 |
| 2019/0005374 A1* | 1/2019 | Shankar | G06N 3/084 |
| 2022/0388160 A1* | 12/2022 | Yonemoto | B23Q 15/00 |

FOREIGN PATENT DOCUMENTS

| | | | | |
|---|---|---|---|---|
| JP | WO 2016189924 A1 * | 12/2016 | | B25J 9/22 |
| JP | WO 2017033376 A1 * | 3/2017 | | B25J 8/22 |
| KR | 2011-0114651 A * | 10/2011 | | B25J 9/22 |
| SE | WO 2004/071717 A1 * | 8/2004 | | G05B 19/425 |
| WO | 2009/107358 A1 | 9/2009 | | |

OTHER PUBLICATIONS

Peternel et al., "Adaptive control of Exoskeleton Robots for Periodic Assistive Behaviours Based on EMG Feedback Minimisation," PLOS One, Feb. 16, 2016, pp. 1-26.

Safavi et al., "Teaching the User By Learning From the User: Personalizing Movement Control in Physical Human-robot Interaction," IEEE/CAA Journal of Automatica Sinica, Oct. 2017, vol. 4, No. 4, pp. 704-713.

\* cited by examiner (a)

(b)

(c)

(d)

SKILL TRANSFER MECHANICAL APPARATUS

TECHNICAL FIELD

The present disclosure relates to a skill transfer mechanical apparatus.

BACKGROUND ART

Conventionally, a work performed by a human is learned by a neural network and a robot is controlled by the learned neural network to automate the human's work. For example, as such a technology, a technology disclosed in Patent Document 1 is known. In this technology, when a skilled cameraman operates a robot camera operation apparatus, a robot camera operates according to the operation and images a photographic object. Then, the robot camera outputs an imaging operation state data indicative of a state of the imaging operation to a learning control device. Moreover, a photographic object detecting device outputs photographic object positional data to the learning control device. During learning, the learning control device makes the neural network learn the imaging operation state data by using the photographic object positional data. Further, during an automatic control, the photographic object positional data is inputted into the learned neural network, and operation of the robot camera is controlled by the output from the neural network. Therefore, the skilled cameraman's work is automated.

REFERENCE DOCUMENT OF CONVENTIONAL ART

Patent Document

[Patent Document 1] JP2009-211294A

DESCRIPTION OF THE DISCLOSURE

Problems to be Solved by the Disclosure

However, with the technology disclosed in Patent Document 1, since the robot camera is controlled only by the neural network during the automatic control, it is necessary to raise a degree of achievement of the learning of the neural network to a limit in order to maintain the imaging quality at the same level as the imaging quality of the skilled cameraman. In addition, although it is necessary to change the operating state of the robot camera according to the position of the photographic object, since the number of positions of the photographic object is infinite, an enormous amount of learning data and a start period for the neural network are required in order to appropriately control the operating state of the robot camera according to an actual situation of the photographic object. Therefore, it is difficult to achieve the automation of imaging the photographic object in a short period of time.

Such a problem is a common problem to mechanical apparatuses which perform a work to a work environment, which are used in the industry.

Meanwhile, in the industry, workers have run short according to their ages because of the decreasing birthrate and aging population, and therefore, transferring of the skilled workers' skills is the pressing need, however, there is a problem that the successors of the skills have decreased as well.

The present disclosure is made in view of solving such problems, and one purpose thereof is to provide a skill transfer mechanical apparatus which is capable of transferring a skilled worker's skill in the industry, and achieving an automation of a given work in a short period of time.

SUMMARY OF THE DISCLOSURE

In order to solve the problem described above, a skill transfer mechanical apparatus according to one aspect of the present disclosure includes an operating part having a working part and configured to move the working part so as to perform a work, a controller configured to control a motion of the operating part, a motion information detector configured to detect motion information of the operating part corresponding to the motion of the working part, and a manual motion correcting data generator configured to generate manual motion correcting data indicative of a manual motion correction that is a correction of a motion of the working part by an operator. The controller includes a basic motion instructing module configured to output a basic motion instruction for causing the working part to carry out a basic motion by the operating part, a learning module configured to output an automatic motion correcting instruction, a motion correcting data generator configured to add the manual motion correcting data to the automatic motion correcting instruction to generate motion correcting data, a motion correcting data storing module configured to store the motion correcting data, and a motion information storing module configured to store the motion information. The learning module carries out machine learning of the motion correcting data stored in the motion correcting data storing module by using the motion information stored in the motion information storing module, and after the machine learning is finished, accepts an input of the motion information during the operation of the operating part, and outputs the automatic motion correcting instruction. The operating part moves the working part according to an automatic motion instruction based on the basic motion instruction and the automatic motion correcting instruction, and the manual motion correction.

Here, the manual motion correction by the operator is made by inputting the manual motion correcting instruction according to the operation of the operator into the controller by using an operation apparatus or by the operator physically applying a force directly or indirectly to the working part. In the former case, the operation apparatus constitutes the manual motion correcting data generator. In the latter case, the manual motion correcting data generator is configured to subtract the automatic motion instruction from the motion data in the motion information to generate the manual motion correcting data. Here, the motion data includes at least one of force data indicative of a force which is applied to the work environment by the working part, and positional data indicative of a position of the working part during the operation of the operating part.

According to this configuration, since the operating part operates the working part according to the automatic motion instruction based on the basic motion instruction and the automatic motion correcting instruction, and the manual motion correction, if the operator does not perform the manual motion correction and the learning module does not perform the automatic motion correction, the operating part causes the working part to carry out the basic motion according to the basic motion instruction outputted from the basic motion instructing module. The operator monitors the motion of the working part, while visually checking the work by the working part, and when the given work is not carried out in a skilled motion by the basic motion, he/she performs the manual motion correction so that the given work is carried out in the skilled motion. Then, the basic motion is corrected by the manual motion correction, and, thereby, the given work is carried out in the skilled motion. In the meantime, the manual motion correcting data indicative of the manual motion correction related to the given work is generated, this manual motion correcting data is added to the automatic motion correcting instruction outputted from the learning module to generate the motion correcting data, and the machine learning of this motion correcting data is carried out by the learning module. When the learning module does not perform the automatic correction as described above, the learning module learns only the manual motion correcting data based on the motion correction by the operator. Since the motion information on the operating part corresponding to the motion of the working part is inputted into the learning module during the operation of the operating part, when an operating state in which the given work is not carried out in the skilled motion similarly to the above occurs, the motion correcting instruction learned as described above is outputted from the learning module as the automatic motion correcting instruction. Therefore, the basic motion instruction is corrected in a direction in which the given work is carried out in the skilled motion, and if this correction is appropriate, the given work is carried out in the skilled motion.

However, if the learning is insufficient, or if the operating state of the operating part in case where the given work is not carried out in the skilled motion is significantly different from the learned one, the given work is not carried out in the skilled motion regardless of the correction being made. Then, the operator performs the manual motion correction so that the given work is carried out in the skilled motion, and thereby, the given work is carried out in the skilled motion by the operating part. Then, the manual motion correcting data corresponding to the further manual motion correction is added to the automatic motion correcting instruction corresponding to the last manual motion correction, and this is learned by the learning module. Therefore, the correction capability of the learning module to the basic motion of the working part improves. After that, when these operations are repeated and the correction capability of the learning module to the basic motion of the working part improves to a level equivalent to that of the operator, the correction to the basic motion of the working part by the operator becomes unnecessary. In this state, the learning module appropriately corrects the basic motion of the working part, and causes the working part to appropriately carry out the given work, instead of the operator.

Thus, if the operator is an expert, the manual motion correction of the operator constitutes the expert's "skill," and this "skill" is accumulated in the learning module and is transferred to the learning module, and therefore, the learning module becomes a "successor" of the "skill" of the expert. As a result, the mechanical apparatus provided with the learning module becomes a "skill transfer mechanical apparatus."

Moreover, according to this configuration, since the operating part is configured to operate according to the automatic motion instruction based on the basic motion instruction and the automatic motion correcting instruction, and the manual motion correction, even when the insufficient automatic motion correcting instruction is outputted from the learning module, the operator can perform the manual motion correction while watching the motion of the working part to cause the operating part to carry out the suitable operation. Thus, a trial and a correction of the suitable operation can be performed by the practice on the site. In other words, since the learning module can be caused to learn through the practice on the site, the enormous amount of learning data and the start period for the learning module are unnecessary. As a result, the automation of the given work can be achieved in a short period of time.

Moreover, according to this configuration, since a part of the basic motion of the working part related to the given work which does not need to be corrected is automatically carried out by the basic motion instructing module, the operator only performs the required correction(s). Therefore, the operator's burden is reduced. Moreover, since the work varies even if the operator is an expert, if only a part of the work is performed by the operation of the operator in this way, the accuracy of the work improves compared with a case where all the works is performed by the operation of the operator.

Moreover, although it is possible to transfer the expert's skill by storing the manual motion correcting data corresponding to the manual motion correction of the operator in the storing module, since the number of modes in which the basic motion of the working part must be corrected exist infinitely, it is actually difficult to transfer the expert's skill by using such a technique. On the other hand, if the learning module is used like the above configuration, the transfer of the expert's skill can easily be realized by, each time the event in which the basic motion of the working part must be corrected occurs, causing the learning module to learn the manual motion correction (accurately motion correcting data) according to this mode.

The manual motion correcting data generator may be an operation apparatus which outputs the manual motion correcting instruction according the operation of the operator as the manual motion correcting data. The mechanical apparatus may further include a motion information presenting mechanism which presents the motion information to the operator so that the operator is able to perceive the motion information. The motion correcting data generator may be a motion correcting instruction generator which adds the manual motion correcting instruction to the automatic motion correcting instruction to generate the motion correcting instruction, and the motion correcting data storing module may be a motion correcting instruction storing module which stores the motion correcting instruction. The learning module may carry out the machine learning of the motion correcting instruction stored in the motion correcting instruction storing module by using the motion information stored in the motion information storing module, and after the machine learning is finished, the motion information may be inputted during the operation of the operating part, and the learning module may output the automatic motion correcting instruction. In the mechanical apparatus, the operating part may move the working part according to the automatic motion instruction based on the basic motion instruction and the automatic motion correcting instruction, and the manual motion correcting instruction.

According to this configuration, the motion of the working part can be corrected by the operator operating the operation apparatus. Thus, the operator can manipulate the operating part at a position distant from the working part. Moreover, since the operator can operate the operation apparatus while grasping the motion of the working part corresponding to the motion information by the motion information presenting mechanism, the motion of the working part can exactly be corrected.

The mechanical apparatus may be a mechanical system including machinery including a machinery body as the operating part having an end effector part as the working part and configured to move the end effector part so that the end effector part performs a work to a work target object, and the controller configured to control the operation of the machinery body, and the operation apparatus, also serving as the motion information presenting mechanism, configured to output a manual motion correcting instruction according to the operation of the operator, while generating a reaction force according to force data as the motion information indicative of a force applied to the work target object by the end effector part of the machinery body. The basic motion instructing module may output a basic motion instruction for causing the end effector part to carry out the basic motion by the machinery body. The learning module may carry out machine learning of the motion correcting instruction stored in the motion correcting instruction storing module by using the motion information stored in the motion information storing module, and after the machine learning is finished, accept an input of the motion information during the operation of the machinery body, and output the automatic motion correcting instruction. The machinery body may move the end effector part according to the automatic motion instruction based on the basic motion instruction and the automatic motion correcting instruction, and the manual motion correcting instruction.

According to this configuration, an operating type skill transfer mechanical system can be achieved. In detail, the motion of the end effector part can be corrected by the operator operating the operation apparatus. Thus, the operator can manipulate the machinery body at a position distant from the machinery body. Moreover, since the operator can operate the operation apparatus while generating the reaction force according to force data, the motion of the end effector part can exactly be corrected.

The motion information detector may include a motion data detector provided to the machinery body. The motion data detector may include a force data detector configured to detect the force data indicative of a force applied to the work target object by the end effector part, and a positional data detector configured to detect positional data indicative of a position of the end effector part during the operation of the machinery body, and the motion data detector may output the force data and the positional data as motion data. The motion information storing module may be a motion data storing module configured to store the motion data. The learning module may carry out machine learning of the motion correcting instruction by using the motion data, and after the machine learning is finished, accept an input of the motion data, and output the automatic motion correcting instruction.

According to this configuration, bilateral control in the operating type skill transfer mechanical system can suitably be realized.

The machinery body may operate according to a current instruction and may further include an adjusting module configured to output the current instruction based on the motion instruction.

According to this configuration, the skill transfer mechanical system in which the machinery body operates according to the current instruction, can suitably be realized.

The skill transfer mechanical apparatus may further include a switch part configured to selectively connect and disconnect a communication path of the manual motion correcting instruction, from the operation apparatus to the controller, and may be configured to be capable of training the operator using the operation apparatus, while the switch part disconnects the communication path.

According to this configuration, when the communication path of the manual motion correcting instruction, from the operation apparatus to the controller is disconnected, the operating part does not operate even if the operation apparatus is operated. Thus, an inexperienced operator can actually operate the operation apparatus to practice the operation of the operation apparatus. In addition, since the mechanical apparatus is configured to be capable of training the operator using the operation apparatus, an inexperienced operator can suitably be trained.

The skill transfer mechanical apparatus may further include an operation apparatus controlling module configured to control operation of the operation apparatus by using the force data and the automatic motion correcting instruction, and control operation of a switch part. The operation apparatus controlling module may have a training mode and a non-training mode, and in the non-training mode, cause the switch part to connect a communication path, and control the operation apparatus to output a manual motion correcting instruction according to the operation of the operator, while generating a reaction force according to the force data, and in the training mode, cause the switch part to disconnect the communication path, and control the operation apparatus to output the manual motion correcting instruction according to the operation of the operator. The operation apparatus controlling module may calculate a deviation of the manual motion correcting instruction from the automatic motion correcting instruction, and when the deviation is above a given value, control the operation apparatus to carry out an operation of outputting the manual motion correcting instruction corresponding to the automatic motion correcting instruction.

According to this configuration, if the mechanical apparatus which has learned up to a practical-use level is used, the automatic motion correcting instruction which becomes a model is outputted from the learning module when the mechanical apparatus is caused to perform a given work. On the other hand, in such a state, when the operator operates the operation apparatus, the deviation of the manual motion correcting instruction by this operation from the automatic motion correcting instruction which becomes the model, is calculated. Then, when the deviation is above the given value (i.e., when the operation of the operator is inappropriate more than a given level), the operation apparatus is controlled so that the operation apparatus carries out the operation to output the manual motion correcting instruction corresponding to the automatic motion correcting instruction which becomes the model. Therefore, the operator is guided by the operation apparatus so that he/she carries out a suitable operation. Thus, an inexperienced operator can be trained suitably.

The operation apparatus controlling module may control the operation apparatus in the training mode to output a manual motion correcting instruction according to the operation of the operator, while generating a reaction force according to the force data.

According to this configuration, the operator is able to operate the operating part with a feeling as if using his/her hand, thus the operator can be trained more suitably.

The motion information may include motion data, and the motion data may include force data indicative of force which is applied to the work environment by the working part, and positional data indicative of the position of the working part during the operation of the operating part. The manual motion correction may be a correction of the motion of the working part by the operator physically applying the force directly or indirectly to the working part. The manual motion correcting data generator may generate the manual motion correcting data by subtracting the basic motion instruction from the motion data which is detected by the motion information detector and reflects the manual motion correction.

According to this configuration, the motion of the working part can be corrected by the operator physically applying the force directly or indirectly to the working part. Therefore, the motion of the working part can be corrected finely, even if it is a difficult work.

The mechanical apparatus may be machinery including a machinery body as the operating part having an end effector part as the working part and configured to move the end effector part so as to perform a work to a work target object, and the controller configured to control a motion of the machinery body. The basic motion instructing module may output a basic motion instruction for causing the end effector part to carry out a basic motion by the machinery body. The learning module may carry out machine learning of the motion correcting data stored in the motion correcting data storing module by using the motion information stored in the motion information storing module, and after the machine learning is finished, accept an input of the motion information during the operation of the machinery body, and output the automatic motion correcting instruction. The machinery body may move the end effector part according to the automatic motion instruction based on the basic motion instruction and the automatic motion correcting instruction, and the manual motion correction.

According to this configuration, a guiding type skill transfer mechanical system can suitably be realized. In detail, the motion of the end effector part can be corrected by the operator physically applying the force directly or indirectly to the end effector part. Therefore, the motion of the working part can be corrected finely, even if it is a difficult work.

The motion information detector may include a motion data detector provided to the machinery body. The motion data detector may include a force data detector configured to detect the force data indicative of a force applied to the work target object by the end effector part and a positional data detector configured to detect the positional data indicative of the position of the end effector part during the operation of the machinery body, and the motion data detector may output the force data and the positional data as motion data. The motion information storing module may be a motion data storing module configured to store the motion data. The learning module may carry out machine learning of the motion correcting data by using the motion data, and after the machine learning is finished, accept an input of the motion data, and output the automatic motion correcting instruction.

According to this configuration, bilateral control in the guiding type skill transfer mechanical system can suitably be realized.

The end effector part may be an end effector, the machinery body may be a robot body, the machinery may be a robot, and the mechanical system may be a robot system. According to this configuration, an operating type skill transfer robot system or a guiding type skill transfer robot can be achieved.

Effect of the Disclosure

The effect of the present disclosure is that a skill transfer mechanical apparatus can be provided, which is capable of transferring a skilled worker's skill in the industry, and achieving an automation of a given work in a short period of time.

MODES FOR CARRYING OUT THE DISCLOSURE

Figure 1:
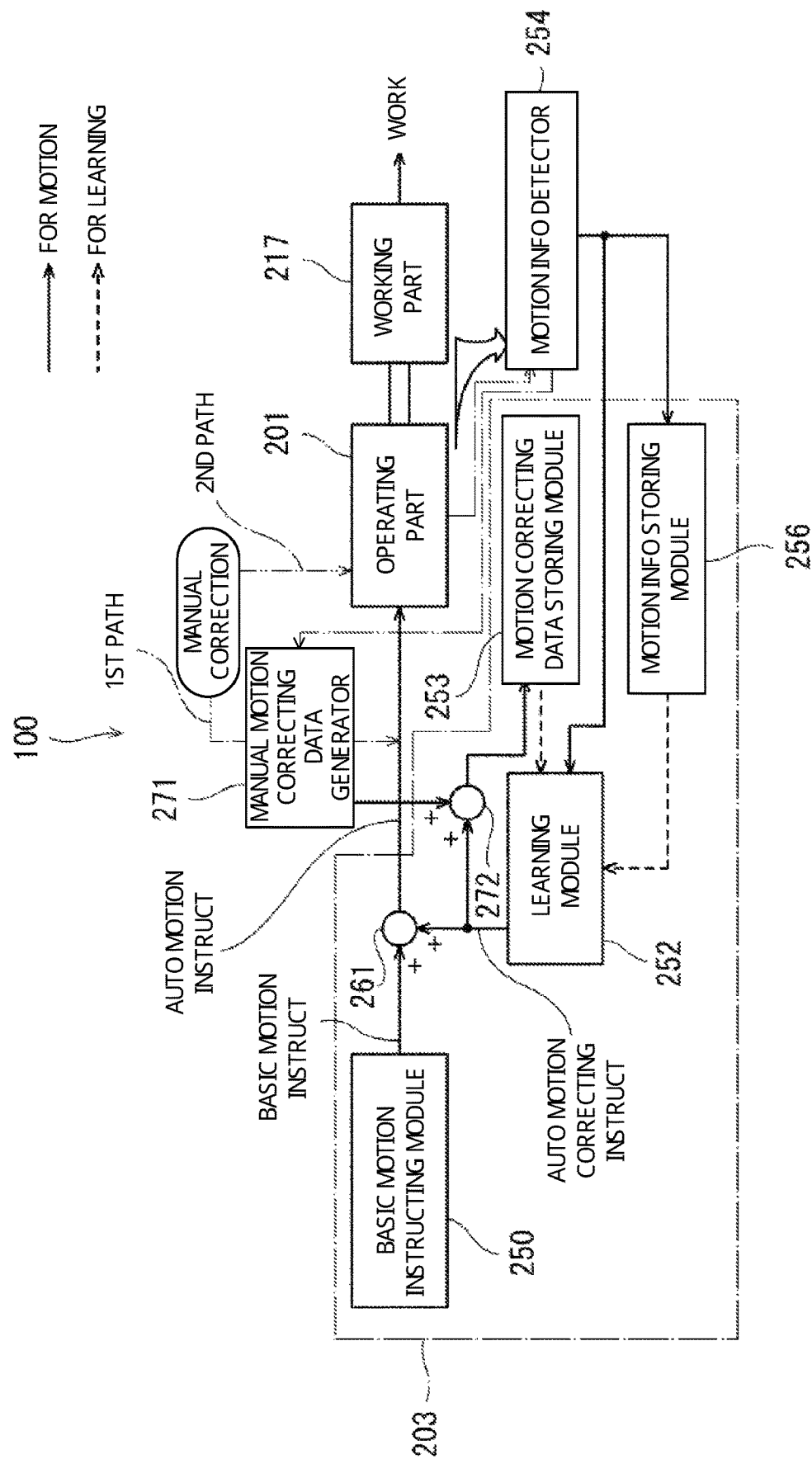
FIG. 1 is a functional block diagram illustrating a configuration of a skill transfer mechanical apparatus according to Embodiment 1 of the present disclosure.

Hereinafter, embodiments of the present disclosure will be described with reference to the accompanying drawings. Note that, throughout the figures, the same reference characters are assigned to the same or corresponding elements to omit redundant description. Moreover, the accompanying drawings are figures illustrating the present disclosure. Therefore, an element unrelated to the present disclosure may be omitted, the scale may not be exact for exaggeration, the drawings may be simplified, and the shape of the same element may be different in a plurality of drawings.

Embodiment 1

Embodiment 1 of the present disclosure illustrates a skill transfer mechanical apparatus. FIG. 1 is a functional block diagram illustrating a configuration of the skill transfer mechanical apparatus according to Embodiment 1 of the present disclosure. In FIG. 1, solid line arrows indicate flows of motion instructions, data, and information of an operating part 201, and broken line arrows indicate flows of learning instructions, data, and information of a learning module 252. This is the same in FIGS. 2, 5, 6, 13, 14, and 16.

[Configuration]

Referring to FIG. 1, the skill transfer mechanical apparatus (hereinafter, may be referred to as "the mechanical apparatus") 100 of Embodiment 1 includes the operating part 201 which has a working part 217 and moves the working part 217 so as to perform a work, a controller 203 which controls operation of the operating part 201, a motion information detector 254 which detects motion information on the operating part 201 corresponding to the motion of the working part 217, and a manual motion correcting data generator 271 which generates manual motion correcting data indicative of a manual motion correction which is a correction of the motion of the working part 217 by an operator.

The mechanical apparatus 100 is any mechanical apparatus, as long as it performs a work to a work environment with motive power. For example, the mechanical apparatus 100 includes a construction machinery, a tunnel boring machine, a crane, and an industrial robot. For example, if the mechanical apparatus 100 is the construction machinery and is a shovel car, a shovel is the working part 217, and a linkage mechanism which moves the shovel is the operating part 201, and a controlling part which carries out a hydraulic control of the linkage mechanism is the controller 203. If the mechanical apparatus 100 is the tunnel boring machine, a digging blade is the working part 217, an actuating mechanism which drives the digging blade is the operating part 201, and a controlling part which controls the operation of the actuating mechanism is the controller 203. If the mechanical apparatus 100 is the industrial robot, an end effector is the working part 217, a robot body, such as a robotic arm, which moves the end effector is the operating part 201, and a robot controlling part which controls the operation of the robot body is the controller 203. The motive power may be any kind of power generating device. The type of the motive power includes an electrical motor, an internal combustion engine, and steam. The control may be any kind of control. For example, the kind of control includes an electric control, a hydraulic control, and a pneumatic control.

For example, the controller 203 is comprised of an arithmetic unit having a processor and a memory. The controller 203 includes a basic motion instructing module 250 which outputs a basic motion instruction for causing the working part 217 to carry out a basic motion by the operating part 201, the learning module 252 which outputs an automatic motion correcting instruction, a motion correcting data generator 272 which adds the manual motion correcting data to the automatic motion correcting instruction to generate motion correcting data, a motion correcting data storing module 253 which stores the motion correcting data, and a motion information storing module 256 which stores the motion information. Blocks 250, 252, 272, and 261 in FIG. 1 are functional blocks implemented by the processor executing a given program stored in the memory of the arithmetic unit. The storing modules 253 and 254 are comprised of a memory or memories of the arithmetic unit.

The learning module 252 is a learning model which carries out a machine learning, and such a learning model includes a neural network, a regression model, a tree model, a Bayesian model, a time series model, a clustering model, and an ensemble learning model. In Embodiment 1, the learning model is a neural network.

The learning module 252 is configured to carry out the machine learning of the motion correcting data stored in the motion correcting data storing module 253 by using the motion information stored in the motion information storing module 256, and after the machine learning is finished, accept an input of the motion information during the operation of the operating part 201, and output the automatic motion correcting instruction.

The operating part 201 is configured to move the working part 217 according to the automatic motion instruction based on the basic motion instruction and the automatic motion correcting instruction, and the manual motion correction.

Here, the manual motion correction by the operator acts on the mechanical apparatus 100 via a first path or a second path depending on whether the mechanical apparatus 100 is an operating type or a guiding type, and the manual motion correcting data corresponding to the manual correction is generated. The "operating type" means a type in which the operating part is operated by an operation apparatus. The "guiding type" means a type in which the operator manually operates the operating part.

If the mechanical apparatus 100 is the operating type, the manual motion correction goes via the first path. In detail, by inputting the manual motion correcting instruction according to the operation of the operator into the controller 203 by using the operation apparatus or by the operator physically applying a force directly or indirectly to the working part 217, the manual motion correction is made and the manual motion correcting data (manual motion correcting instruction described later) is generated. Therefore, the operation apparatus constitutes the manual motion correcting data generator 271.

If the mechanical apparatus 100 is a guiding type, the manual motion correction goes via the second path. In detail, by the operator physically applying the force directly or indirectly to the working part 217, the manual motion correction is made. Then, operation of the operating part 201 reflecting the manual motion correction is detected by the motion information detector 254, and the manual motion correcting data generator 271 subtracts the automatic motion instruction from the motion data in the motion information detected by the motion information detector 254 to generate the manual motion correcting data.

The motion information detector 254 detects the information related to the operation of the operating part 201. The motion information in each embodiment of the present disclosure includes the motion data as essential information. The motion data includes at least one of force data indicative of a force which is applied to the work environment by the working part 217, and the positional data indicative of a position of the working part 217 during the operation of the operating part 201. The reason of the motion information including the motion data as the essential information is that the controller 203 controls the operation of the operating part 201 by controlling at least one of the "force" applied to the work environment by the working part 217 and the "position" of the working part 217 during the operation of the operating part 201. Therefore, the "instruction" in each embodiment of the present disclosure includes at least one of a force instruction for instructing a target value or a correction value (compensation value) of the "force," and a positional instruction which is an instruction for instructing a target value or a correction value (compensation value) of the "position."

Thus, in each embodiment of the present disclosure, the "instructions" can be added or subtracted to/from each other, and the "motion instruction (motion correcting instruction)," the "motion data," and the "motion correcting data" can be added or subtracted to/from each other.

The motion information other than the motion data includes the image pick-up data of the work of the working part 217, vibration data or impact data generated in the working part 217, and sound data generated at the working part 217.

[Operation and Effects]

According to Embodiment 1, since the operating part 201 operates the working part 217 according to the automatic motion instruction based on the basic motion instruction and the automatic motion correcting instruction, and the manual motion correction, if the operator does not perform the manual motion correction and the learning module 252 does not perform the automatic motion correction, the operating part 201 causes the working part 217 to carry out the basic motion according to the basic motion instruction outputted from the basic motion instructing module 250. The operator monitors the motion of the working part 217, while visually checking the work by the working part 217, and when the given work is not carried out in the skilled motion by the basic motion, he/she performs the manual motion correction so that the given work is carried out in the skilled motion. Then, the basic motion is corrected by the manual motion correction, and, thereby, the given work is carried out in the skilled motion. In the meantime, the manual motion correcting data indicative of the manual motion correction related to the given work is generated, this manual motion correcting data is added to the automatic motion correcting instruction outputted from the learning module 252 to generate the motion correcting data, and the machine learning of this motion correcting data is carried out by the learning module 252. When the learning module 252 does not perform the automatic correction as described above, the learning module 252 learns only the manual motion correcting data based on the motion correction by the operator. Since the motion information on the operating part 201 corresponding to the motion of the working part 217 is inputted into the learning module 252 during the operation of the operating part 201, when an operating state in which the given work is not carried out in the skilled motion similarly to the above occurs, the motion correcting instruction learned as described above is outputted from the learning module 252 as the automatic motion correcting instruction. Therefore, the basic motion instruction is corrected in a direction in which the given work is carried out in the skilled motion, and if this correction is appropriate, the given work is carried out in the skilled motion.

However, if the learning is insufficient, or if the operating state of the operating part 201 in case where the given work is not carried out in the skilled motion is significantly different from the learned one, the given work is not carried out in the skilled motion regardless of the correction being made. Then, the operator performs the manual motion correction so that the given work is carried out in the skilled motion, and thereby, the given work is carried out in the skilled motion by the operating part 201. Then, the manual motion correcting data corresponding to the further manual motion correction is added to the automatic motion correcting instruction corresponding to the last manual motion correction, and this is learned by the learning module 252. Therefore, the correction capability of the learning module 252 to the basic motion of the working part 217 improves. After that, when these operations are repeated and the correction capability of the learning module 252 to the basic motion of the working part 217 improves to a level equivalent to that of the operator, the correction to the basic motion of the working part 217 by the operator becomes unnecessary. In this state, the learning module 252 appropriately corrects the basic motion of the working part 217, and causes the working part 217 to appropriately carry out the given work, instead of the operator.

Thus, if the operator is an expert, the manual motion correction of the operator constitutes the expert's "skill," and this "skill" is accumulated in the learning module 252 and is transferred to the learning module 252, and therefore, the learning module 252 becomes a "successor" of the "skill" of the expert. As a result, the mechanical apparatus 100 provided with the learning module 252 becomes a "skill transfer mechanical apparatus."

Moreover, according to Embodiment 1, since the operating part 201 is configured to operate according to the automatic motion instruction based on the basic motion instruction and the automatic motion correcting instruction, and the manual motion correction, even when the insufficient automatic motion correcting instruction is outputted from the learning module 252, the operator can perform the manual motion correction while watching the motion of the working part 217 to cause the operating part 201 to carry out the suitable operation. Thus, a trial and a correction of the suitable operation can be performed by the practice on the site. In other words, since the learning module 252 can be caused to learn through the practice on the site, the enormous amount of learning data and the start period for the learning module 252 are unnecessary. As a result, the automation of the given work can be achieved in a short period of time.

Moreover, according to Embodiment 1, since a part of the basic motion of the working part 217 related to the given work which does not need to be corrected is automatically carried out by the basic motion instructing module 250, the operator only performs the required correction(s). Therefore, the operator's burden is reduced. Moreover, since the work varies even if the operator is an expert, if only a part of the work is performed by the operation of the operator in this way, the accuracy of the work improves compared with a case where all the works is performed by the operation of the operator.

Moreover, although it is possible to transfer the expert's skill by storing the manual motion correcting data corresponding to the manual motion correction of the operator in the storing module, since the number of modes in which the basic motion of the working part must be corrected exist infinitely, it is actually difficult to transfer the expert's skill by using such a technique. On the other hand, if the learning module 252 is used like Embodiment 1, the transfer of the expert's skill can easily be realized by, each time the event in which the basic motion of the working part 217 must be corrected occurs, causing the learning module 252 to learn the manual motion correction (accurately motion correcting data) according to this mode.

Note that the more detailed configuration of the mechanical apparatus 100 is illustrated by the following embodiments.

Embodiment 2

Figure 2:
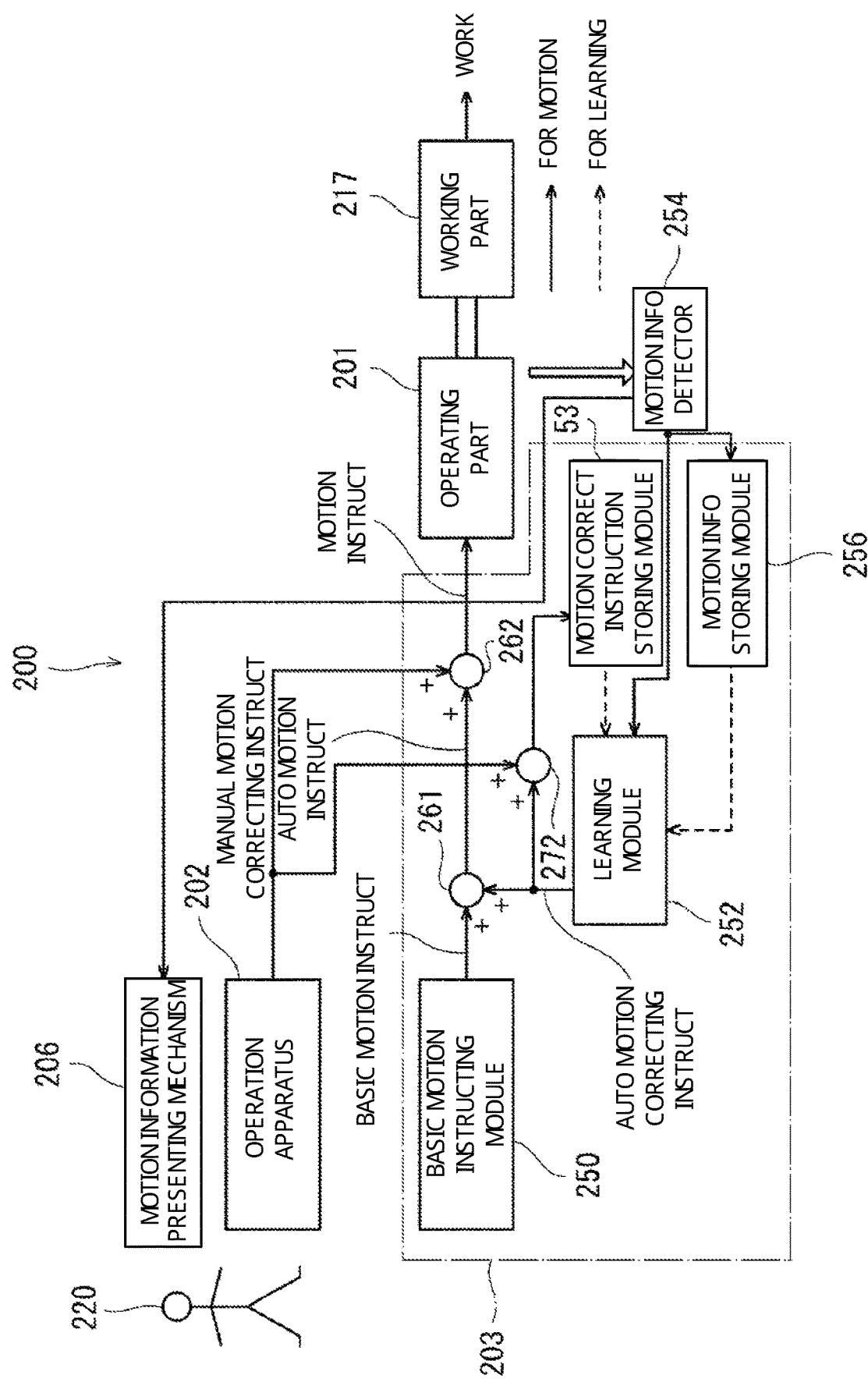
FIG. 2 is a block diagram illustrating a configuration of a skill transfer mechanical apparatus according to Embodiment 2 of the present disclosure.

Embodiment 2 of the present disclosure illustrates an operating type skill transfer mechanical apparatus. FIG. 2 is a block diagram illustrating a configuration of the skill transfer mechanical apparatus according to Embodiment 2 of the present disclosure. The skill transfer mechanical apparatus 200 of Embodiment 2 is different from the skill transfer mechanical apparatus 100 of Embodiment 1 in the following configuration, and other configurations thereof are the same as those of the skill transfer mechanical apparatus 100 of Embodiment 1. Below, this difference is described.

Referring to FIG. 2, in the mechanical apparatus 200 of Embodiment 2, the manual motion correcting data generator 271 of Embodiment 1 is an operation apparatus 202 which outputs the manual motion correcting instruction according the operation of the operator 220 as the manual motion correcting data. The mechanical apparatus 200 further includes a motion information presenting mechanism 206 which presents the motion information to the operator 220 so that the operator 220 is able to perceive the motion information. In the mechanical apparatus 200, the motion correcting data generator 272 of Embodiment 1 is a motion correcting instruction generator 272 which adds the manual motion correcting instruction to the automatic motion correcting instruction to generate the motion correcting instruction, and the motion correcting data storing module 253 is a motion correcting instruction storing module 53 which stores the motion correcting instruction. The learning module 252 carries out the machine learning of the motion correcting instruction stored in the motion correcting instruction storing module 53 by using the motion information stored in the motion information storing module 256, and after the machine learning is finished, the motion information is inputted during the operation of the operating part 201, and the learning module 252 outputs the automatic motion correcting instruction.

Moreover, in the mechanical apparatus 200, the operating part 201 moves the working part 217 according to the automatic motion instruction based on the basic motion instruction and the automatic motion correcting instruction, and the manual motion correcting instruction.

Organizing the above differences, the mechanical apparatus 200 of Embodiment 2 includes the operating part 201 which has the working part 217 and moves the working part 217 so as to perform the work, the controller 203 which controls the operation of the operating part 201, the motion information detector 254 which detects the motion information on the operating part 201 corresponding to the motion of the working part 217, the operation apparatus 202 which outputs the manual motion correcting instruction according the operation of the operator 220, and the motion information presenting mechanism 206 which presents the motion information to the operator 220 so that the operator 220 can perceive the motion information. The controller 203 includes the basic motion instructing module 250 which outputs the basic motion instruction for causing the working part 217 to carry out the basic motion by the operating part 201, the learning module 252 which outputs the automatic motion correcting instruction, the motion correcting instruction generator 272 which adds the manual motion correcting instruction to the automatic motion correcting instruction to generate the motion correcting instruction, the motion correcting instruction storing module 53 which stores the motion correcting instruction, and the motion information storing module 256 which stores the motion information. The learning module 252 is configured to carry out the machine learning of the motion correcting instruction stored in the motion correcting instruction storing module 53 using the motion information stored in the motion information storing module 256, and after the machine learning is finished, accept the input of the motion information during the operation of the operating part 201, and output the automatic motion correcting instruction, and the operating part 201 is configured to move the working part 217 according to the automatic motion instruction based on the basic motion instruction and the automatic motion correcting instruction, and the manual motion correcting instruction.

According to Embodiment 2, the motion of the working part 217 can be corrected by the operator 220 operating the operation apparatus 202. Thus, the operator 220 can manipulate the operating part 201 at a position distant from the working part 217. Moreover, since the operator 220 can operate the operation apparatus 202 while perceiving the motion of the working part 217 corresponding to the motion information by the motion information presenting mechanism 206, the motion of the working part 217 can exactly be corrected.

Embodiment 3

Figure 3:
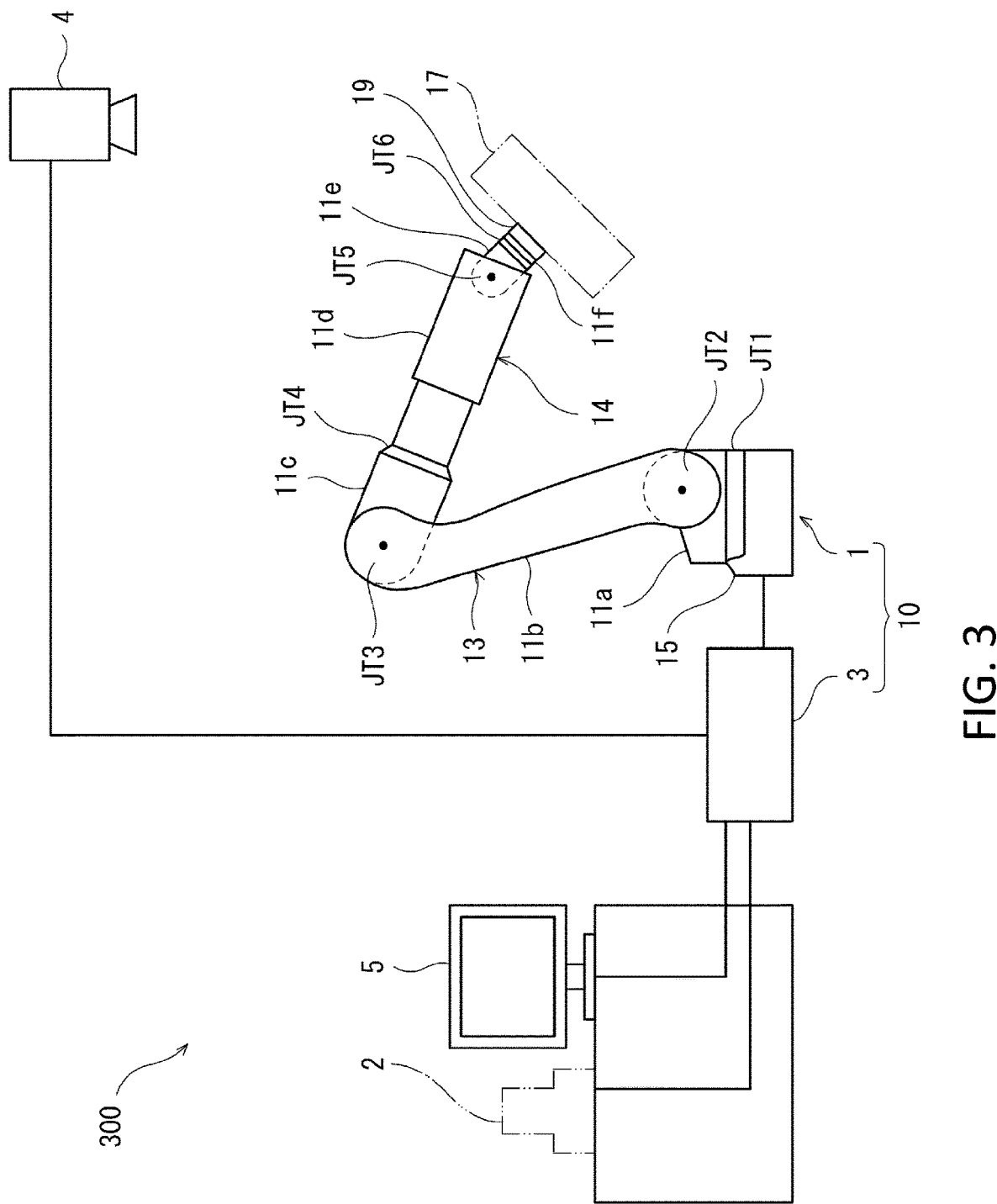
FIG. 3 is a schematic diagram illustrating a configuration of hardware of a skill transfer robot system according to Embodiment 3 of the present disclosure.

Embodiment 3 of the present disclosure illustrates an operating type skill transfer robot system (hereinafter, may be referred to as "the robot system"). FIG. 3 is a schematic diagram illustrating a configuration of hardware of the skill transfer robot system according to Embodiment 3 of the present disclosure. Referring to FIG. 3, a robot system 300 of Embodiment 3 is different from the mechanical apparatus 200 of Embodiment 2 in the following configuration, and other configurations thereof are the same as those of the mechanical apparatus 200 of Embodiment 2. Below, this difference is described.

In Embodiment 3, the mechanical apparatus 200 of Embodiment 2 is configured as the robot system 300 which includes a robot 10 having a robot body 1 as the operating part 201 which has an end effector 17 as the working part 217 and moves the end effector 17 so as to perform a work to a work target object, and a controller 3 which controls operation of the robot body 1, and an operation apparatus 2 which also serves as the motion information presenting mechanism 206, and outputs the manual motion correcting instruction according the operation of the operator while generating a reaction force according to the force data as the motion information indicative of a force which is applied by the end effector 17 of the robot body 1 to the work target object.

In the robot system 300, a basic motion instructing module 50 is configured to output the basic motion instruction for causing the end effector 17 to carry out the basic motion by the robot body 1, and a learning module 52 is configured to carry out the machine learning of the motion correcting instruction stored in the motion correcting instruction storing module 53 by using the motion data stored in a motion data storing module 56, and after the machine learning is finished, accept the input of the motion data during the operation of the robot body 1, and output the automatic motion correcting instruction.

Moreover, the robot body 1 is configured to move the end effector 17 according to the automatic motion instruction based on the basic motion instruction and the automatic motion correcting instruction, and the manual motion correcting instruction.

According to this configuration, the operating type skill transfer robot system 300 can be realized. In detail, by the operator operating the operation apparatus 2, the motion of the end effector 17 can be corrected. Thus, the operator can manipulate the robot body 1 at a position distant from the robot body 1. Moreover, since the operator can operate the operation apparatus 2 while generating the reaction force according to the force data, the motion of the end effector 17 can exactly be corrected.

Below, the configuration and operation of the robot system 300 are described in detail.

[Configuration of Hardware]

Referring to FIG. 3, the skill transfer robot system 300 of Embodiment 3 includes the robot body 1, the operation apparatus 2, the controller 3, a camera 4, and a monitor 5. The robot body 1 and the controller 3 constitute the robot 10. The robot body 1 includes the end effector 17. For example, the robot body 1 is comprised of the robotic arm, and the end effector 17 is attached to a tip end of a wrist part 14 of the robotic arm through a force sensor 19. The force sensor 19 constitutes a force data detector. The force data detector constitutes a part of a motion data detector 273 provided to the robot body 1. Moreover, the camera 4 and the monitor 5 constitute a part of the motion information presenting mechanism 206 (see FIG. 2).

Below, these components are described in order.

A well-known camera can be used as the camera 4. The camera 4 is installed at a location where it can image operation of the robot body 1.

A well-known monitor can be used as the monitor 5. The monitor 5 is installed near the operation apparatus 2.

For example, the controller 3 includes a processor and a memory. The controller 3 controls the operation of the robot body 1 by the processor reading and executing a given operation program stored in the memory. In detail, for example, the controller 3 is comprised of a microcontroller, an MPU, an FPGA (Field Programmable Gate Array), a PLC (Programmable Logic Controller), or a logic circuit.

<Robot Body 1>

The robot body 1 includes a pedestal 15, an arm part 13 supported by the pedestal 15, and the wrist part 14 which is supported at a tip end of the arm part 13 and to which the end effector 17 is attached. As illustrated in FIG. 3, the robot body 1 is an articulated robotic arm having a plurality of, three or more joints JT1-JT6, which is comprised of a plurality of serially coupled links 11a-11f. In more detail, at the first joint JT1, the pedestal 15 and a base-end part of the first link 11a are coupled to each other rotatably on an axis extending in the vertical direction. At the second joint JT2, a tip-end part of the first link 11a and a base-end part of the second link 11b are coupled to each other rotatably on an axis extending in the horizontal direction. At the third joint JT3, a tip-end part of the second link 11b and a base-end part of the third link 11c are coupled to each other rotatably on an axis extending in the horizontal direction. At the fourth joint JT4, a tip-end part of the third link 11c and a base-end part of the fourth link 11d are coupled to each other rotatably on an axis extending in the longitudinal direction of the fourth link 11d. At the fifth joint JT5, a tip-end part of the fourth link 11d and a base-end part of the fifth link 11e are coupled to each other rotatably on an axis perpendicular to the longitudinal direction of the link 11d. At the sixth joint JT6, a tip-end part of the fifth link 11e and a base-end part of the sixth link 11f are rotatably coupled to each other in a twistable manner. A mechanical interface is provided to a tip-end part of the sixth link 11f. The end effector 17 as an end effector corresponding to the type of the work of the robot body 1 is detachably attached to the mechanical interface through the force sensor 19. For example, the force sensor 19 is comprised of 3-axis acceleration sensor. The force sensor 19 detects a force which is applied to the work target object by the end effector 17 (a reaction force from the work target object). The force detected by the force sensor 19 is converted into force data by a suitable signal processor (not illustrated). For example, this signal processor is provided to the force sensor 19 or the controller 3. It is expressed herein that the force sensor 19 detects the force data, for convenience.

The arm part 13 of the robot body 1 is formed by a coupling body of the links and joints comprised of the first joint JT1, the first link 11a, the second joint JT2, the second link 11b, the third joint JT3, and the third link 11c described above. Moreover, the wrist part 14 of the robot body 1 is formed by a coupling body of the links and joints comprised of the fourth joint JT4, the fourth link 11d, the fifth joint JT5, the fifth link 11e, the sixth joint JT6, and the sixth link 11f described above.

The joints JT1-JT6 is each provided with a drive motor (not illustrated) as one example of an actuator which relatively rotates two members coupled through the joint. For example, the drive motor is a servomotor which is servo-controlled through a servo amplifier by a current instruction transmitted from the controller 3. Moreover, the joints JT1-JT6 is each provided with a rotation angle sensor (not illustrated) for detecting a rotation angle of the drive motor and a current sensor (not illustrated) for detecting current of the drive motor. For example, the rotation angle sensor is comprised of an encoder.

The controller 3 converts the total of the rotation angles of the drive motors of all the joints into positional data of the end effector 17. Data detected by the force sensor 19 is the force data, and these force data and the positional data are motion data of the robot body 1. The rotation angle sensor and the force sensor 19 constitute the motion data detector 273. Detection signal of the current sensor is used by the controller 3 (in detail, an adjusting module 51) for carrying out a feedback control of the current of the servomotor of each joint so as to become a value according to the current instruction.

<Operation Apparatus 2>

Figure 4:
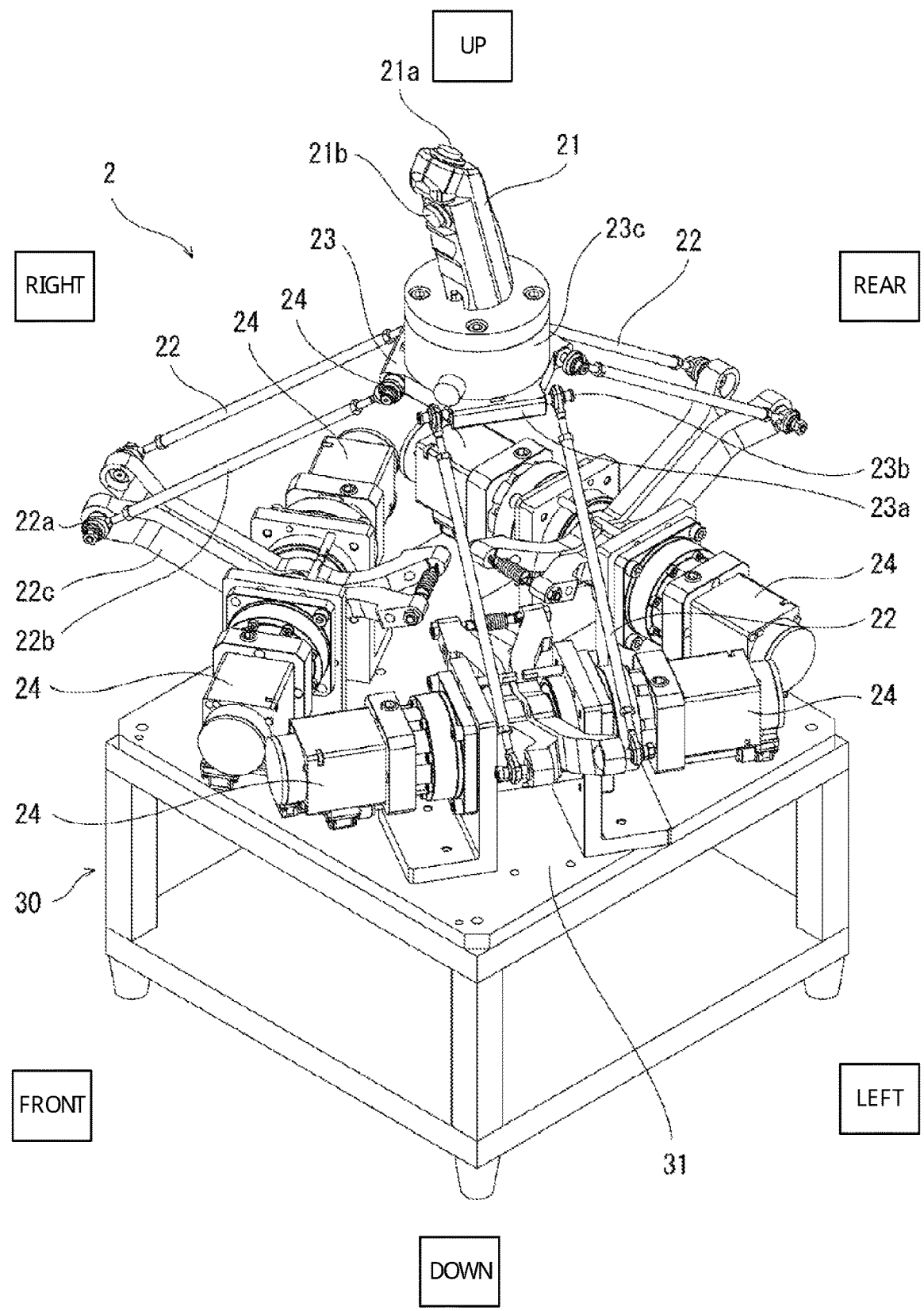
FIG. 4 is a perspective view illustrating a configuration of an operation apparatus of FIG. 3.

FIG. 4 is a perspective view illustrating a configuration of the operation apparatus 2 of FIG. 3. Referring to FIG. 4, the operation apparatus 2 includes a grip part 21 which is gripped by the operator, arm parts 22 which movably support the grip part 21, and motors 24. The motor 24 is comprised of a servomotor.

The grip part 21 is formed so that the operator is grippable and holdable of the grip part 21 in order for the operator to easily grip. While the operator grips and holds the grip part 21, the operator moves the grip part 21 to move the robot body 1, thereby manipulating the robot body 1.

The grip part 21 is supported by a support part 23. Moreover, the grip part 21 is connected with the support part 23 through a cylindrical connecting part 23c. The support part 23 is movably supported by the arm parts 22. The arm part 22 is connected to the motor 24.

Each arm part 22 has a joint 22a, and therefore, it is formed so as to be bendable centering on the joint 22a. Therefore, the arm part 22 is comprised of a grip-side arm part 22b and a motor-side arm part 22c which are bendably connected through the joint 22a.

The motor 24 is supported by a support table 30. Six motors 24 are provided. The six motors 24 are disposed on the support table 30 in a triangular shape so that a pair of motors 24 constitute each side. In more detail, the six motors 24 are disposed so that a rotation axis (center axis) of a main shaft of a pair of motors 24 constitutes one side of the equilateral triangle. The pair of arm parts 22 are provided corresponding to the pair of motors 24 which constitute one side. One of three sides 23a which define the contour of the support part 23 is sandwiched by the pair of arm parts 22. A shaft 23b is disposed at the side 23a of the support part 23, passing through the inside of the support part 23. The shaft 23b is rotatably held by the two grip-side arm parts 22b sandwiching the side 23a at both ends thereof about three axes perpendicular to each other including the center axis of the shaft 23b. Therefore, the support part 23 is rotatably supported about the three axes perpendicular to each other including the center axis of the shaft 23b. Thus, the support part 23 is rotatably supported by the two grip-side arm parts 22b about three axes perpendicular to each other including the center axis of the shaft 23b. The configuration of the side 23a and the shaft 23b of the support part 23 are similar for the three sides of the support part 23. Here, the center axes of the three shafts 23b form an equilateral triangle.

Moreover, the joint 22a described above connects the grip-side arm part 22b to the motor-side arm part 22c rotatably about three axes perpendicular to each other including an axis parallel to the center axis of the output shaft of the pair of motors 24. Therefore, the rotation angles of the six motors 24 are determined uniquely according to the position and posture of the support part 23.

Next, a control system of the operation apparatus 2 is described. In this embodiment, a bilateral control is performed using the operation apparatus 2. In the operation apparatus 2, the six motors 24 is each servo-controlled (position control) by the controller 3 through the servo amplifier. The six motors 24 is each provided with a rotation angle sensor (not illustrated). For example, the rotation angle sensor is comprised of an encoder. Detection signal of the rotation angle sensor is transmitted to an operation apparatus controlling module 42 of the controller 3. The detection signal of the rotation angle sensor is converted by the controller 3 into the manual motion instruction which is positional data of the support part 23. Below, it is expressed that the manual motion correcting instruction is outputted from the operation apparatus 2, for convenience. On the other hand, the operation apparatus controlling module 42 of the controller 3 controls an output torque of each motor based on the force data inputted from the robot body 1. The output torque is controlled so that a reaction force according to the force data is generated for the operation of the grip part 21 by the operator. Moreover, in the bilateral control, when the force instruction is required from the operation apparatus 2, a force sensor (e.g., a 3-axis acceleration sensor) is provided between the grip part 21 and the support part 23, and the force instruction is generated based on the output of the force sensor. Depending on the type of the bilateral control, there are a case where only the manual position correcting instruction constitutes the manual motion correcting instruction, and a case where the manual position correcting instruction and the manual force correcting instruction constitute the manual motion correcting instruction.

Moreover, push buttons 21a and 21b are provided to the grip part 21 of the operation apparatus 2. For example, these are used for operating the end effector 17.

Next, operation when the robot body 1 is manipulated by the operation apparatus 2 is described. When manipulating the arm part 13 and the wrist part 14 of the robot body 1 by the operation apparatus 2, the operator grips the grip part 21. While the operator gripping the grip part 21, when the operator moves the grip part 21 in a direction in which he/she wants to move the robot body 1, the support part 23 which supports the grip part 21 moves with the movement of the grip part 21. Moreover, by the movement of the support part 23, the six arm parts 22 connected to the support part 23 move.

When the six arm parts 22 move, the output shafts of the six motors 24 rotate accordingly, and the rotation angles are detected by the six rotation angle sensors. The detection signals are converted into the manual position correcting instruction as described above, and the controller 3 generates the motion instruction based on the manual motion correcting instruction including the manual position correcting instruction, the basic motion instruction, and the automatic motion correcting instruction, and the motion instruction is transmitted to the robot body 1. Then, the robot body 1 operates so that the end effector 17 takes the position and posture reflecting the position and posture of the support part 23. Therefore, the operator can manipulate the robot body 1 as he/she intended by operating the grip part 21 of the operation apparatus 2.

On the other hand, in the meantime, since the operation apparatus controlling module 42 controls each drive motor so that the reaction force is generated according to the force data transmitted from the robot body 1 for the operation of the grip part 21 by the operator, the operator feels the reaction force of the movement of the grip part 21. Therefore, the operator can manipulate the position and posture of the end effector 17, while feeling the reaction force which acts on the end effector 17 of the robot body 1 from the work target object.

Note that the operation apparatus 2 is not limited to this configuration. For example, the operation apparatus 2 may be comprised of a master robot which has a similar shape and configuration to the robot body 1, and the robot body 1 may be controlled as a slave robot. Moreover, the operation apparatus 2 may be a joystick.

The installed position of the operation apparatus 2 is not limited in particular. For example, the operation apparatus 2 may be installed in the end effector 17 of the robot body 1.

[Configuration of Control System]

Figure 5:
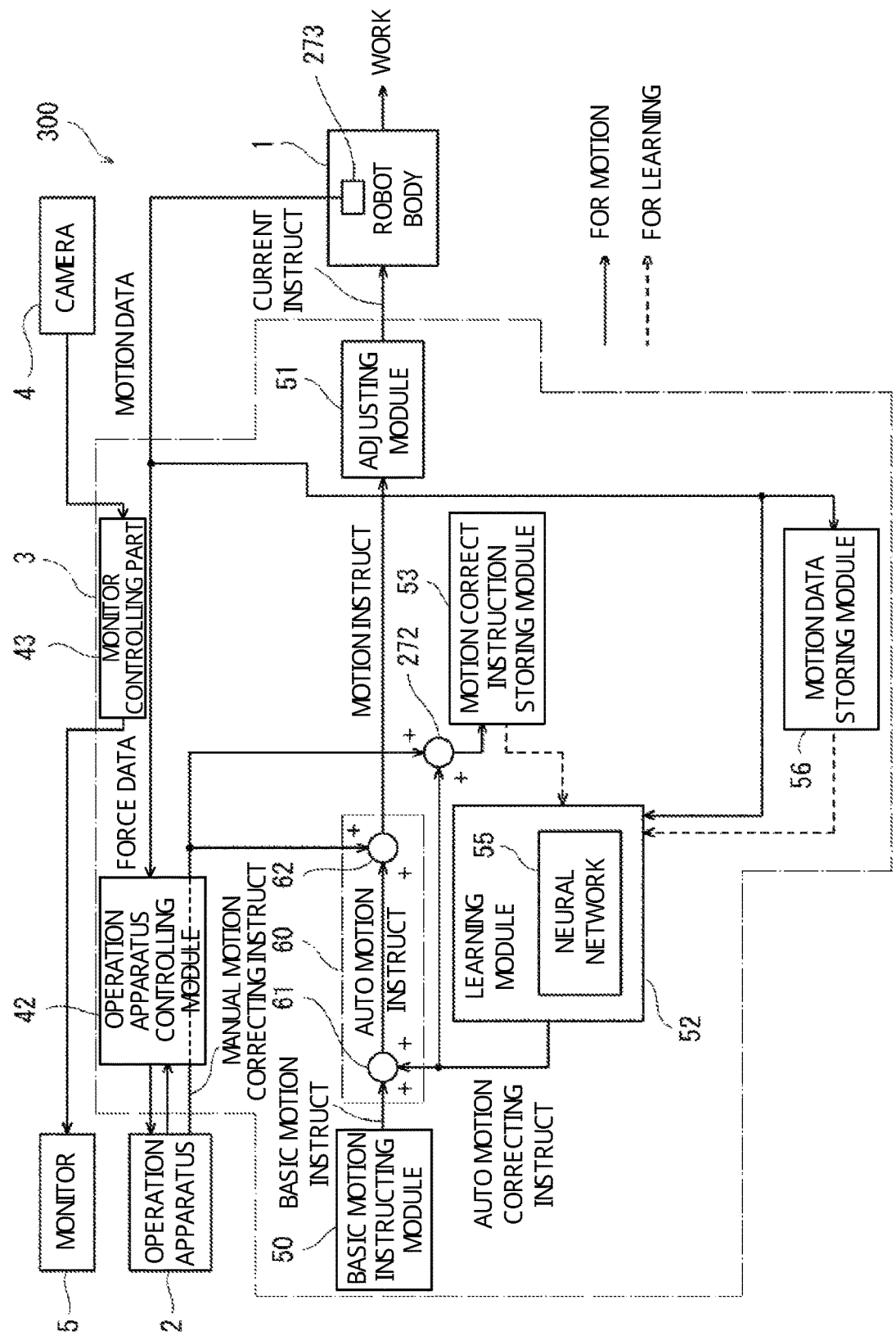
FIG. 5 is a functional block diagram illustrating a configuration of a control system of the skill transfer robot system of FIG. 3.

FIG. 5 is a functional block diagram illustrating a configuration of the outline of a control system of the skill transfer robot system of FIG. 3.

First, the control system of the camera 4 and the monitor 5 are described. The controller 3 is provided with the operation apparatus controlling module 42. The camera 4 images a scene of the operating range of the robot body 1, and transmits an image pick-up signal to a monitor controlling part 43. The monitor controlling part 43 converts the received image pick-up signal into an image display signal, and transmits it to the monitor 5. The monitor 5 displays an image according to the received image display signal. Therefore, the image captured by the camera 4 is displayed on the monitor 5. The operator operates the operation apparatus 2 to manipulate the robot body 1, watching the image displayed on the monitor 5.

Next, the control system of the robot body 1 is described.

Referring to FIG. 5, the controller 3 includes the basic motion instructing module 50, a motion instruction generating module 60, the adjusting module 51, the learning module 52, the motion correcting instruction storing module 53, and the motion data storing module 56. These modules are functional blocks implemented by the processor which constitutes the controller 3 executing a given operation program stored in the memory which constitutes the controller 3.

Although the bilateral control is performed for the control of the robot body 1, depending on its type, there are a case where the instruction to the robot body 1 requires only the positional instruction related to the position of the end effector 17, and a case where it requires the positional instruction and the force instruction related to the force which acts on the work target object by the effector 17. Thus, below, each instruction includes both the cases where only the positional instruction is needed, and where both the positional instruction and the force instruction are needed.

Figure 7:
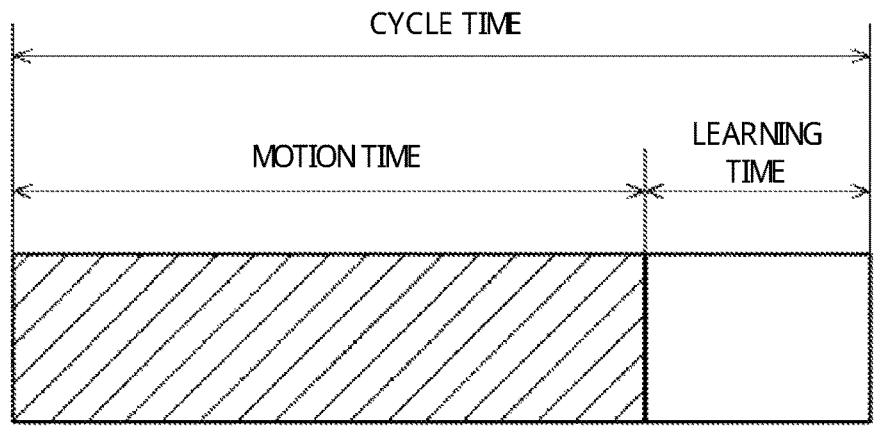
FIG. 7 is a schematic diagram illustrating a cycle time of operation of a robot body of FIG. 3.

Moreover, as illustrated in FIG. 7, here, the robot 10 repeatedly carries out a given work at a given cycle time. This cycle time is roughly divided into a "motion time" during which the robot 10 performs the given work, and a "learning time" during which the robot 10 (accurately, a neural network 55) learns. Both the times may be partially overlapped with each other. Note that the operation of the robot 10 is not limited to the mode in which the given work is repeatedly carried out at the given cycle time. The robot 10 may operate so as to perform a desired work and the learning.

The motion instruction generating module 60 generates the motion instruction based on the basic motion instruction, the automatic motion correcting instruction outputted from the learning module 52, and the manual motion correcting instruction outputted from the operation apparatus 2, and outputs the motion instruction. Here, the automatic motion correcting instruction is added to the basic motion instruction to generate the automatic motion correcting instruction, and the manual motion correcting instruction is added to this to generate the motion instruction. However, these instructions may be add to each other, and therefore, these instructions may be added in any kind of method.

The adjusting module 51 generates the current instruction based on the motion instruction, and transmits it to the robot body 1. In the robot body 1, the drive motor of each joint operates according to the current instruction, and the robot body 1 operates according to the current instruction. Thus, the end effector 17 of the robot body 1 manipulates the work target object, the motion data including the data of the position (positional data) of the end effector 17 and the data of the force (force data) which is applied to the work target object by the end effector 17 (the reaction force received from the work target object) is outputted from the motion data detector 273 of the robot body 1.

The force data of the motion data is converted into the torque output of the drive motor of the operation apparatus 2 by the operation apparatus controlling module 42, and it is transmitted to the operation apparatus 2.

As described above, the operation apparatus 2 outputs the manual motion correcting instruction, when the operator operates the operation apparatus 2 while feeling the reaction force based on the force data. This manual motion correcting instruction is sent to the motion instruction generating module 60, and is also sent to the motion correcting instruction generator 272. The motion correcting instruction generator 272 adds the manual motion correcting instruction to the automatic motion correcting instruction outputted from the learning module 52 to generate the motion correcting instruction. This motion correcting instruction is stored in the motion correcting instruction storing module 53.

The motion correcting instruction storing module 53 outputs the stored manual motion instruction to the learning module 52 as a learning manual motion instruction during the learning of the neural network 55 and during the current operation of the given work (hereinafter, referred to as a "during the current operation"). The motion data outputted from the motion data detector 273 of the robot body 1 is inputted into the learning module 52 and is stored in the motion data storing module 56.

The motion data storing module 56 outputs the stored motion data to the learning module 52 as the learning motion data during the current learning of the neural network 55.

Based on the input during the learning described above, the learning module 52 causes the neural network 55 to learn the current motion correcting instruction, and based on the input during the operation, the learning module 52 outputs a predicted motion correcting instruction which reflects the learning to the motion instruction generating module 60 as the automatic motion correcting instruction.

Figure 6:
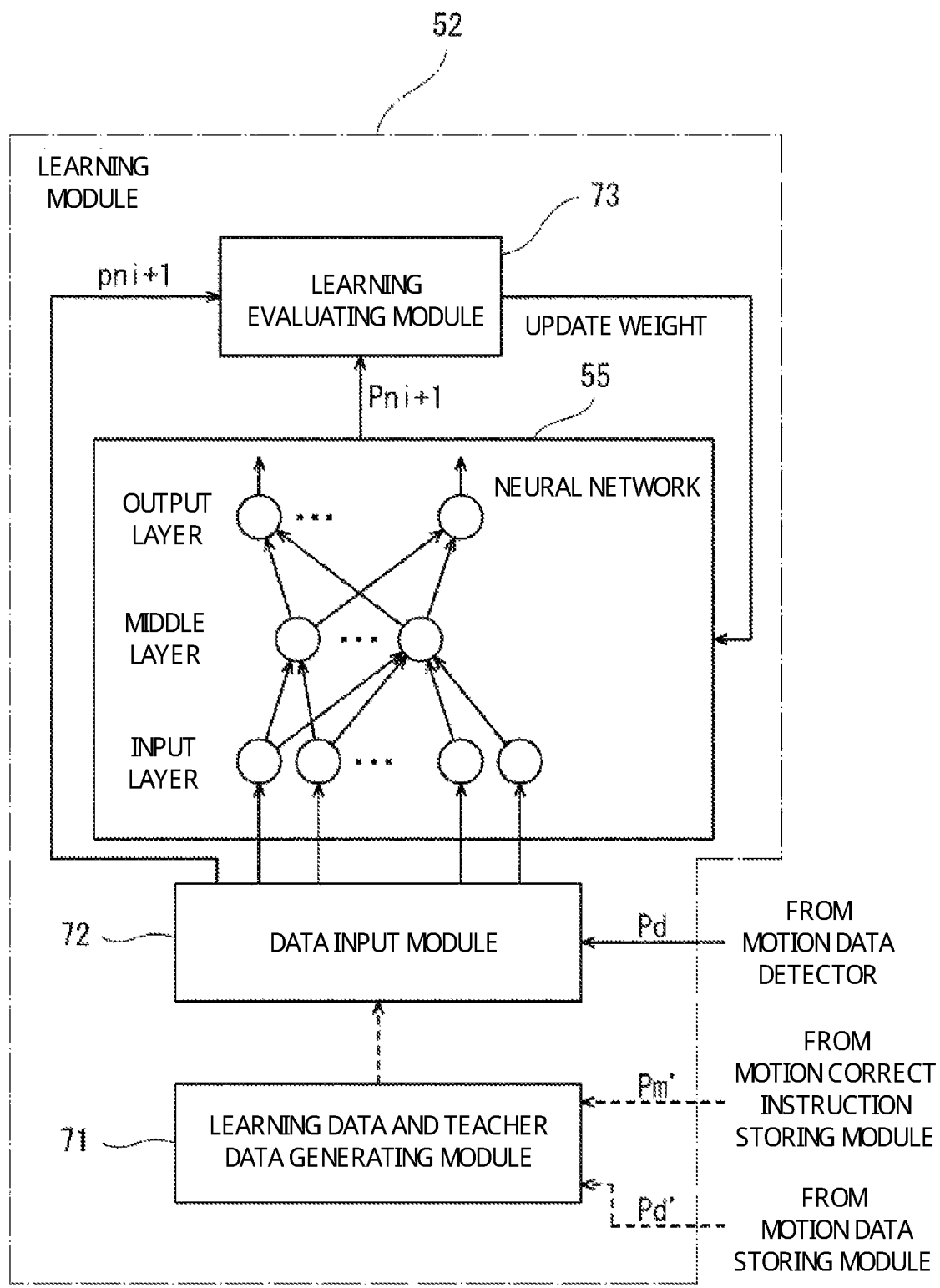
FIG. 6 is a functional block diagram illustrating a detailed configuration of a learning module of FIG. 5.
Figure 8:
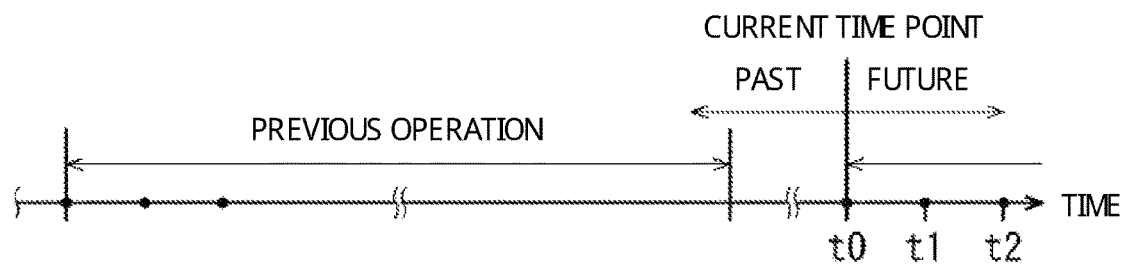
FIG. 8 is a schematic diagram illustrating time series data of each of a manual position correcting instruction, a teacher manual position correcting instruction, and a learning motion data in the skill transfer robot system of FIG. 3.
Figure 8:
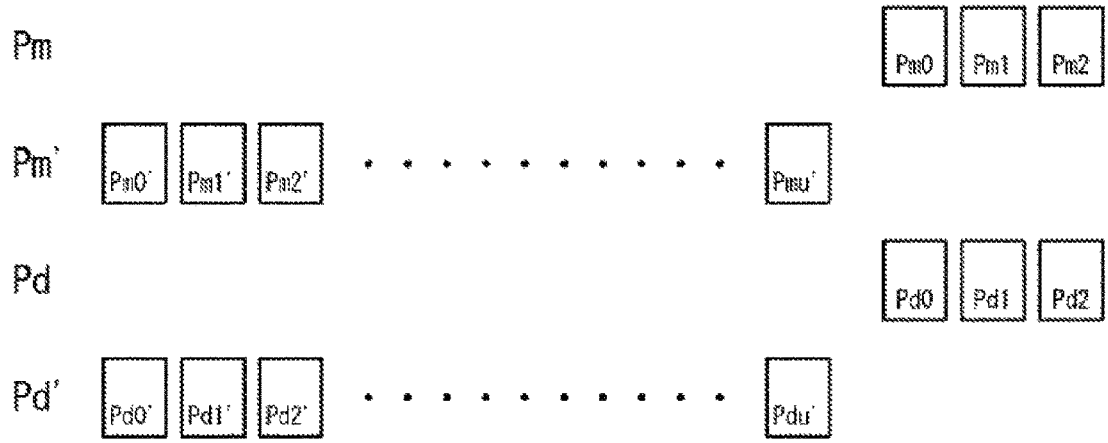

Next, the configuration of the learning module 52 is described in detail. FIG. 6 is a functional block diagram illustrating a detailed configuration of the learning module 52 of FIG. 5. FIG. 7 is a schematic diagram illustrating the cycle time during the operation of the robot body 1 of FIG. 3. FIG. 8 is a schematic diagram illustrating time series data of each of a motion correcting instruction Pm, a learning motion correcting instruction Pm', a motion data Pd, and a learning motion data Pd' in the skill transfer robot system 300 of FIG. 3.

First, a time relation of each instruction is described.

Referring to FIG. 7, the robot 10 (robot body 1) repeatedly carries out the given work at the given cycle time. This cycle time is roughly divided into the "motion time" in which the robot 10 (robot body 1) performs the given work, and the "learning time" in which the robot 10 learns. The operation of the robot 10 during the "motion time" at each cycle time is " . . . operation (e.g., previous operation and current operation)."

Referring to FIG. 8, "operation" currently in progress is the "current operation," and the last "operation" is the "the previous operation." During the operation currently in progress, time series data Pm0, Pm1, and Pm3, . . . , Pmu of the motion correcting instruction Pm (hereinafter, abbreviated as Pm0-Pmu) are acquired at a given sampling interval. Moreover, the time series data Pd0-Pdu of the motion data Pd are acquired similarly. Then, the time series data Pm0-Pmu of the motion correcting instruction Pm acquired during the previous operation become time series data Pm0'-Pmu' of the learning motion correcting instruction Pm' during the current operation. Moreover, the time series data Pd0-Pdu of the motion data Pd acquired during the previous operation become time series data Pd0'-Pdu' of the learning motion data Pd' during the current operation. Below, the number of the adscript in each time series data indicates an order of the sampling timing (intermittent time). Therefore, the time series data with the same number of the adscript mean that they are data acquired at the same sampling timing.

Referring to FIG. 6, the learning module 52 includes the neural network 55, a learning data and teacher data generating module 71, a data input module 72, and a learning evaluating module 73.

The neural network 55 includes an input layer, a middle layer, and an output layer. The number of neurons at each layer is set suitably. A well-known the learning method is applicable to the learning of the neural network 55. Therefore, it is described briefly here. Here, for example, the neural network 55 is a recurrent type neural network.

The learning data and teacher data generating module 71 generates the time series data pn1-pnu of the teacher data pn from the time series data Pm0'-Pmu' of the learning motion correcting instruction Pm'. Moreover, the time series data Pd0'-Pdu−1' of the learning data Pd' is generated from the time series data Pd0'-Pdu' of the learning motion data Pd'.

The data input module 72 sequentially inputs the time series data Pd0'-Pdu−1' of the learning data Pd' into each neuron of the input layer. At this time, when the data input module 72 inputs the time series data Pdi of the learning data Pd' at a certain sampling timing ti, the neural network 55 calculates a predicted motion correcting instruction Pni+1 at the next sampling timing ti+1 by a forward propagation. Then, the learning evaluating module 73 takes in the time series data pni+1 at the next sampling timing ti+1 from the time series data pn1-pnu of the teacher data pn, and, for example, it calculates a total value $e^2$ of a square error of each of the position correcting instruction and the force correcting instruction for the predicted motion correcting instruction Pni+1 and the time series data pni+1 of the teacher data pn. Next, the learning evaluating module 73 updates the weight of the neural network 55 by a backward propagation. The data input module 72 and the learning evaluating module 73 perform this processing for all of the time series data Pd0'-Pdu−1' of the learning data Pd', and, for example, if the total value $e^2$ of the square error becomes below a given threshold in all the processings, the modules end the learning.

After the learning is finished, the data input module 72 inputs the motion data Pd0 at the current sampling timing t0 during the next operation of the robot body 1. Then, the neural network 55 outputs the predicted motion correcting instruction Pn1 at the next sampling timing t1 as the automatic motion correcting instruction.

Therefore, a learning result of the neural network 55 (learning module 52) is reflected to the operation of the robot body 1.

Note that, when inputting the time series data Pdi of the learning data Pd' at a certain sampling timing ti, the input part 72 may input time series data Pdi-1-Pdi-n therebefore (n is a given positive number). However, in this case, the input part 72 similarly needs to input the motion data Pd-1-Pd-n of the past during the next operation of the robot body 1. In this way, the learning efficiency of the neural network 55 improves. This is because, when predicting the motion of the end effector 17, the operator predicts the next motion while watching not only the instant motion at present but also a series of motions before the timing, and therefore, he/she accurately predicts the motion of the end effector 17.

Alternatively, motion information other than the motion data may be used as the learning data and the input data during the operation of the robot body 1.

[Operation]

Next, operation of the robot system 300 constituted as described above is described with reference to FIGS. 3 to 5.

In the robot system 300, the basic motion instructing module 50 outputs the basic motion instruction during the operation of the robot body 1. On the other hand, the learning module 52 outputs the automatic motion correcting instruction. An automatic motion instruction generating module 61 adds the automatic motion correcting instruction to the basic motion instruction to generate the automatic motion instruction. On the other hand, when the operator operates the operation apparatus 2 as needed, the manual motion correcting instruction is outputted. A motion instruction generating module 62 adds the manual motion correcting instruction to the automatic motion correcting instruction to generate the motion instruction. The adjusting module 51 generates the current instruction based on the motion instruction, and outputs it to the robot body 1. The robot body 1 operates so as to move the end effector 17 according to the current instruction. Therefore, the end effector 17 moves according to the basic motion instruction, the automatic motion correcting instruction, and the manual motion correcting instruction.

On the other hand, the motion data detector 273 detects the motion data of the robot body 1 corresponding to the motion of the end effector 17. The force data of the detected motion data is inputted into the operation apparatus controlling module 42. The operation apparatus controlling module 42 controls the operation apparatus 2 so that the operator feels the reaction force based on the force data when the operator operates the operation apparatus 2. On the other hand, the motion data storing module 56 stores the motion data. Moreover, the motion correcting instruction generator 272 adds the manual motion correcting instruction to the automatic motion correcting instruction to generate the motion correcting instruction. The motion correcting instruction storing module 53 stores the motion correcting instruction.

On the other hand, the motion data is inputted into the learning module 52. The learning module 52 outputs the predicted motion correcting instruction reflecting the contents of the learning of the last time as the automatic motion correcting instruction, when the motion data is inputted.

Then, during learning of the learning module 52, the learning module 52 carries out the machine learning of the learning motion correcting instruction stored in the motion correcting instruction storing module 53 by using the learning motion data stored in the motion data storing module 56.

Then, the learning module 52 outputs the predicted motion correcting instruction reflecting the contents of the learning of this time as the next automatic motion correcting instruction during the next operation of the robot body 1.

Note that the adjusting module 51 generates the current instruction from the motion instruction when a forward control is performed, and calculates a deviation of the motion data from the motion instruction, and then generates the current instruction based on the deviation when a feedback control is performed.

[Operation and Effects]

Next, operation and effects of the robot system 300 which operates as described above is described.

<First Operation and Effects>

Figure 9:
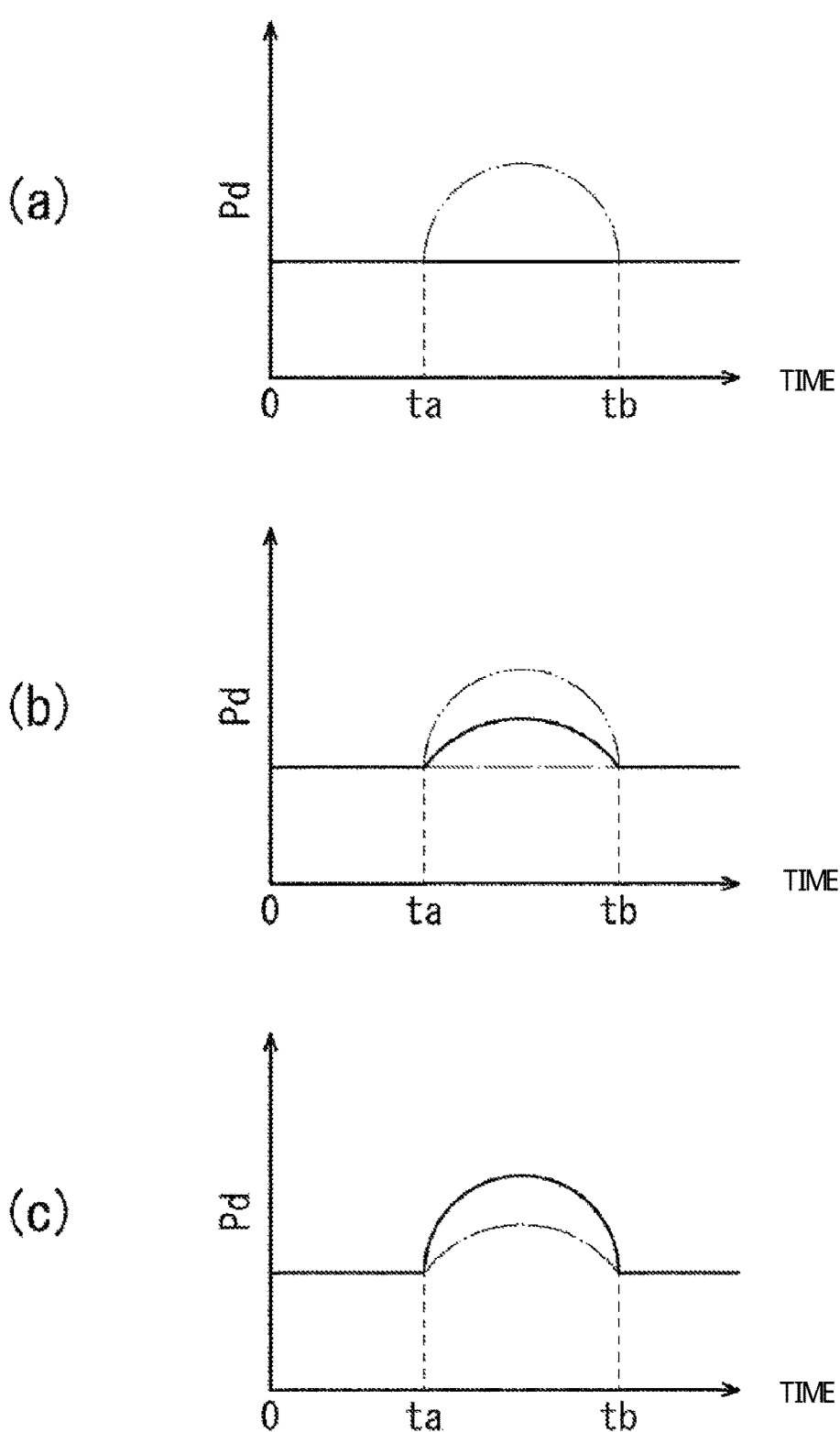
FIGS. 9(a) to (c) are schematic diagrams illustrating a process in which a trace of an end effector is improved to an ideal trace.

Here, first operation and effects are described in an extremely simplified manner. FIGS. 9(a) to (c) are schematic diagrams illustrating a process in which a trace of the end effector 17 is improved to an ideal trace.

In FIGS. 9(a) to (c), the motion data Pd indicates a two-dimensional position. Moreover, a two-dot chain line indicates the ideal trace of the end effector 17 in a time window from a time point ta to a time point tb, and a solid line indicates a trace of the end effector 17 corresponding to the motion instruction in which the basic motion instruction, the automatic motion correcting instruction, and the manual motion correcting instruction are added up, and an one-dot chain line indicates an imaginary trace of the end effector 17 corresponding to the automatic motion instruction in which the basic motion instruction and the automatic motion correcting instruction are added up.

First, a case where the learning module 52 has not learned the manual correction and the operator does not perform the manual correction is described. The learning module 52 learned so as to output the automatic motion correcting instruction of which the correction value is zero in an initialized state. In this case, as illustrated by the solid line in FIG. 9(a), the end effector 17 moves so as to present a basic trace corresponding to the basic motion instruction outputted from the basic motion instructing module 50.

Since the learning module 52 learned last time the motion correcting instruction in which the automatic motion correction of which the correction value is zero and the manual motion correction of which the correction value is zero are added up, the imaginary trace of the end effector 17 corresponding to the automatic motion instruction in the time window ta-tb becomes a trace of the end effector 17 corresponding to the basic motion instruction, as illustrated by the one-dot chain line in FIG. 9(b) during the next operation of the robot body 1. The operator operates the operation apparatus 2 as he/she sees the end effector 17 becoming about to follow this trace to try the first improvement. Then, as illustrated by the solid line in FIG. 9(b), the trace of the end effector 17 is improved so that it approaches the ideal trace.

Since the learning module 52 learned the motion correcting instruction in which the last automatic motion instruction and the last manual motion correcting instruction are added up, and outputs the automatic motion correcting instruction which imitates the last manual motion correcting instruction, the imaginary trace of the end effector 17 corresponding to the automatic motion instruction in the time window ta-tb becomes the same as the trace of the end effector 17 corresponding to the last manual motion correcting instruction as illustrated by the one-dot chain line in FIG. 9(c) during the next operation of the robot body 1. However, as the operator sees the end effector 17 becoming about to follow the imaginary trace, he/she operates the operation apparatus 2 to improve this trace to an ideal trace. Then, as illustrated by the solid line in FIG. 9(c), the trace of the end effector 17 is improved to the ideal trace.

Since the learning module 52 learned the motion correcting instruction in which the last automatic motion instruction and the last manual motion correcting instructions are added up, and outputs the automatic motion correcting instruction which imitates the last manual motion correcting instruction, the imaginary trace of the end effector 17 corresponding to the automatic motion instruction in the time window ta-tb becomes an ideal trace similarly to the trace of the end effector 17 corresponding to the last manual motion correcting instruction during the next operation of the robot body 1. Therefore, after that, the improvement by the operator operating the operation apparatus 2 becomes unnecessary.

Thus, according to the robot system 300 of Embodiment 3, since the manual motion correcting instruction by the operator is accumulated in the learning module 52, the operator's skill is eventually transferred to the learning module 52. Moreover, since the learning module 52 learns through the actual work, the learning period is shortened.

<Second Operation and Effects>

FIGS. 10(a) to (c) are schematic diagrams illustrating a situation in which the robot body 1 smoothly inserts a first object 81 into a second object 82. FIGS. 11(a) to (d) are schematic diagrams illustrating a situation in which the robot body 1 inserts the first object 81 into the second object 82, while groping the second object 82 with the first object 81. FIGS. 12(a) to (d) are schematic diagrams illustrating a situation in which the robot body 1 inserts the first object 81 into the second object 82, while groping the second object 82 with the first object 81.

Here, the second operation and effects are described using a case of fitting of the first object 81 having a short, large-diameter cylindrical head part 81a and a long, small-diameter cylindrical shaft part 81b, and the second object 82 having a cylindrical through-hole 82a in a central part of a short cylindrical main body. Here, although the shaft part 81b of the first object 81 is inserted or fitted into the through-hole 82a of the second object 82, it is assumed that a gap between these is small, and therefore, they may not fit smoothly depending on the positioning error of the robot body 1.

As illustrated in FIGS. 10(a) to (c), the basic motion instruction outputted from the basic motion instructing module 50 moves the end effector 17 so that the first object 81 is located immediately above the second object 82 and both the center axes thereof become in agreement with each other, and the first object 81 is then lowered toward the second object 82. In this case, if the positioning error of the robot body 1 is close to zero, as illustrated in FIGS. 10(a) to (c), the shaft part 81b of the first object 81 is smoothly inserted into the through-hole 82a of the second object 82.

Figure 10:
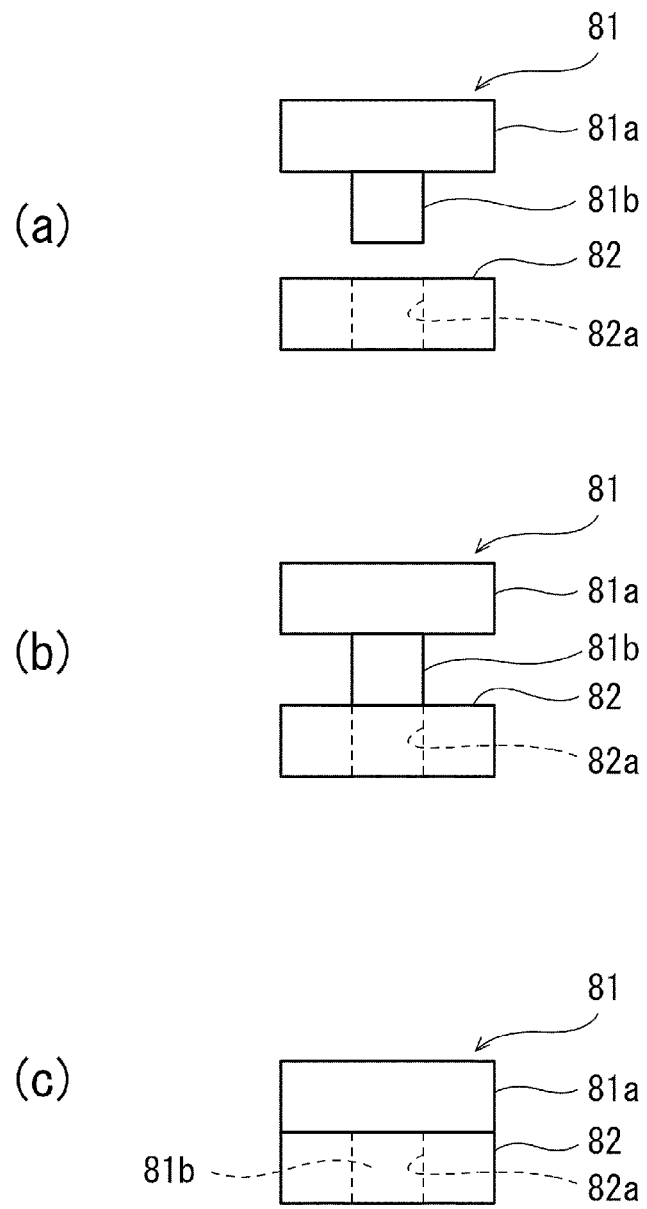
FIGS. 10(a) to (c) are schematic diagrams illustrating a situation in which the robot body smoothly inserts a first object into a second object.
Figure 11:
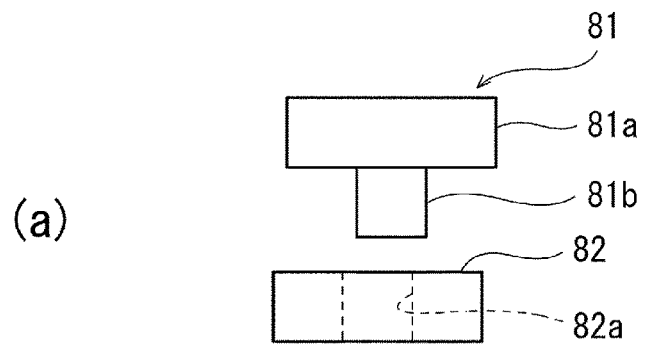
FIGS. 11(a) to (d) are schematic diagrams illustrating a situation in which the robot body inserts the first object into the second object, while groping the second object with the first object.
Figure 11:
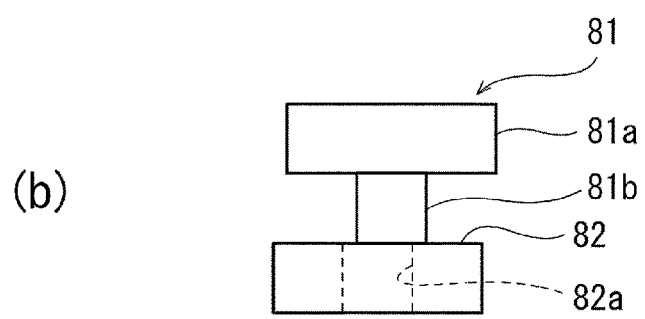
Figure 11:
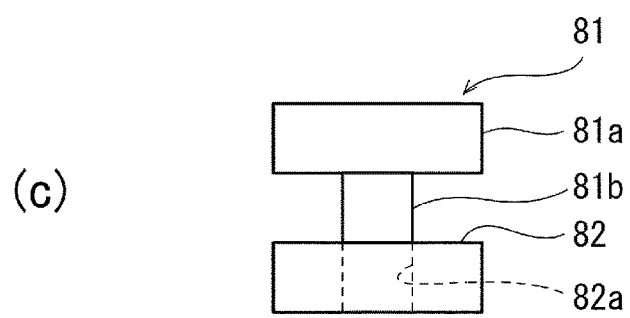
Figure 11:
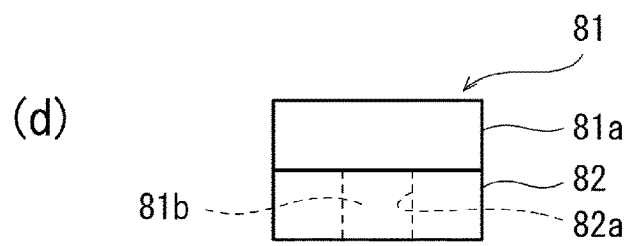

However, as illustrated in FIG. 11(a), because of the positioning error of the robot body 1, when the position of the first object 81 is slightly offset rightward in the drawing, the shaft part 81b of the first object 81 contacts the edge of the through-hole 82a of the second object 82, as illustrated in FIG. 11(b). Then, as illustrated in FIGS. 10(c) and (d), the operator operates the operation apparatus 2 to move the shaft part 81b of the first object 81 so that the shaft part 81b gropes the edge of the through-hole 82a of the second object 82, and the shaft part 81b of the first object 81 is eventually inserted into the through-hole 82a of the second object 82.

The motion data corresponding to this series of groping operation is detected by the motion data detector 273 of the robot body 1 and is stored in the motion data storing module 56. In addition, the manual motion correcting instruction corresponding to the series of groping operation is added up with the automatic motion correcting instruction during the groping operation, and it is stored in the motion correcting instruction storing module 53 as the motion correcting instruction. Then, this motion correcting instruction is associated with the motion data, and it is learned by the learning module 52.

Therefore, because of the positioning error of the robot body 1, when the position of the first object 81 is slightly offset rightward in the drawing, the learning module 52 outputs the automatic motion correcting instruction for causing the robot body 1 to perform the movement imitating the series of groping operation. Therefore, the first object 81 is fitted into the second object 82. Therefore, a part of the operator's skill is transferred to the learning module 52.

Figure 12:
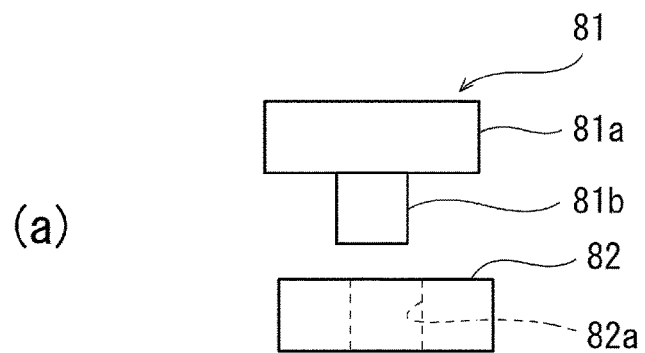
FIGS. 12(a) to (d) are schematic diagrams illustrating a situation in which the robot body inserts the first object into the second object, while groping the second object with the first object.
Figure 12:
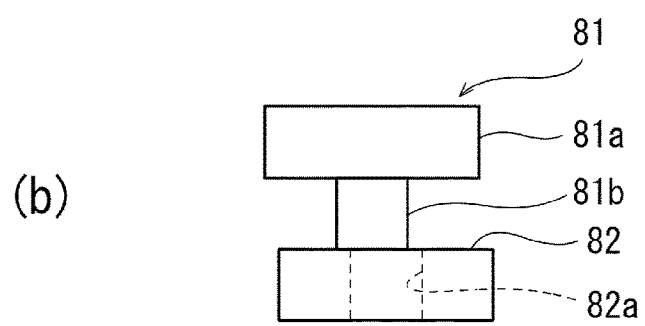
Figure 12:
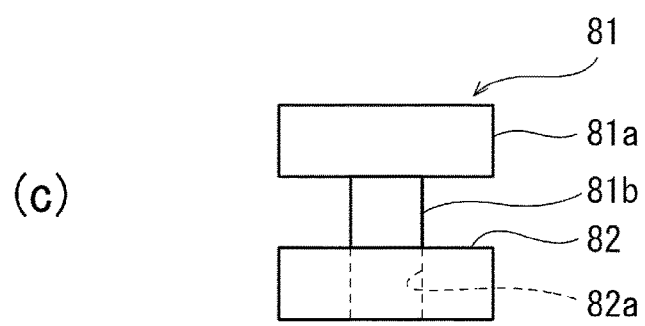
Figure 12:
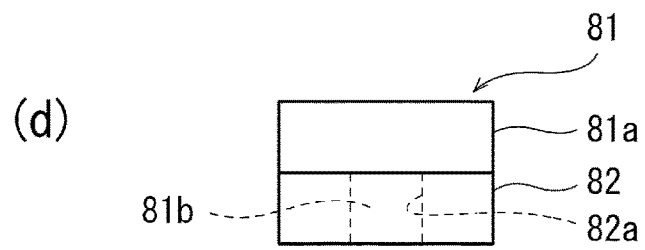

Then, as illustrated in FIG. 12(a), because of the positioning error of the robot body 1, when the position of the first object 81 is slightly offset leftward in the drawing, since the learning module 52 does not learn this event, it outputs the automatic motion correcting instruction which cannot address this event. Therefore, as illustrated in FIG. 12(b), it is assumed that the shaft part 81*b* of the first object 81 contacts the edge of the through-hole 82*a* of the second object 82. Then, as illustrated in FIGS. 10(*c*) and (*d*), the operator operates the operation apparatus 2 to move the shaft part 81*b* of the first object 81 so that the shaft part 81*b* gropes the edge of the through-hole 82*a* of the second object 82, and eventually insert the shaft part 81*b* of the first object 81 into the through-hole 82*a* of the second object 82.

The motion data corresponding to this series of groping operation is detected by the motion data detector 273 of the robot body 1 and is stored in the motion data storing module 56. Moreover, the manual motion correcting instruction corresponding to this series of groping operation is added up with the automatic motion correcting instruction during the groping operation, and it is stored in the motion correcting instruction storing module 53 as the motion correcting instruction. Then, the motion correcting instruction is associated with the motion data, and it is learned by the learning module 52.

Therefore, after that, because of the positioning error of the robot body 1, when the position of the first object 81 is slightly offset leftward in the drawing, the learning module 52 outputs the automatic motion correcting instruction for causing the robot body 1 to perform the operation imitating the series of groping operation. Therefore, the first object 81 is fitted into the second object 82. Therefore, other part of the skill of the operator is transferred to the learning module 52.

Thus, many situations in which the basic motion of the end effector 17 must be corrected exist. However, by using the learning module 252 which carries out the machine learning like the robot system 300, the transfer of the operator's skill can easily be realized by, each time the event in which the basic motion of the end effector 17 must be corrected occurs, causing the learning module 52 to learn the manual motion correcting instruction (accurately, the motion correcting instruction) according to the mode.

Moreover, according to the robot system 300, since a part of the basic motion of the end effector 17 related to the given work, which does not need to be corrected is automatically carried out by the basic motion instructing module 50, the operator only performs the required correction. Therefore, the operator's burden is reduced. Moreover, since the work varies even if the operator is an expert, the accuracy of the work improves compared with the case where all the works is performed by the operation of the operator, by performing only the part of the work by the operation of the operator in this way.

[Bilateral Control]

As the bilateral control, for example, a symmetrical type bilateral control, a force reflection type bilateral control, and a force feedback type bilateral control are known. In Embodiment 3, any of the bilateral controls is applicable. Here, for example, the force reflection type bilateral control is applied. In the force reflection type bilateral control, the "motion instruction" and the "motion correcting instruction" include only the "positional instruction" and the "position correcting instruction."

[Application to Other Mechanical Apparatuses]

In Embodiment 3, by replacing each element of the robot system 300 with each corresponding element of other mechanical apparatuses, the contents of Embodiment 3 are easily applicable to other mechanical apparatuses.

Embodiment 4

Figure 13:
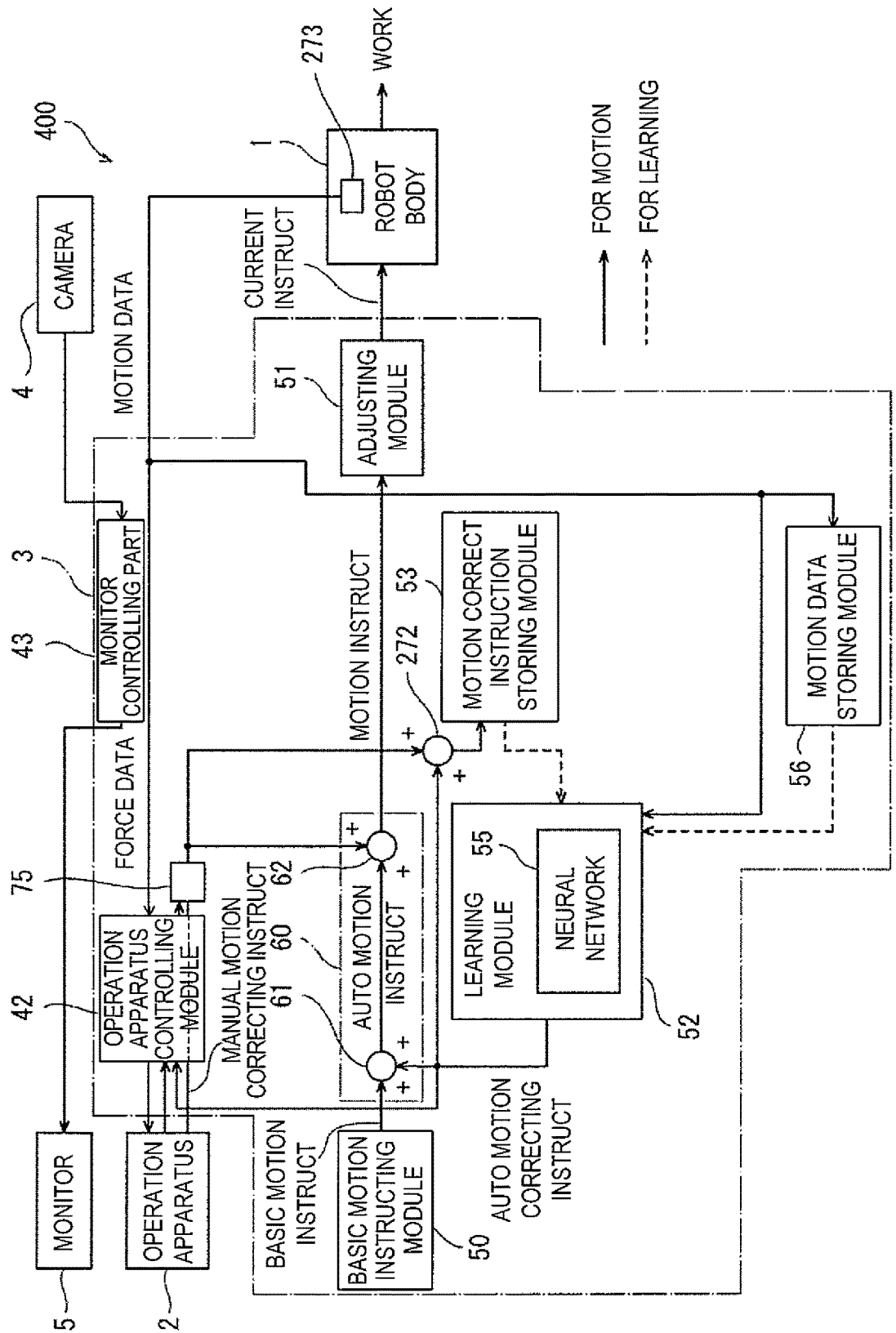
FIG. 13 is a functional block diagram illustrating a configuration of a control system of a skill transfer robot system according to Embodiment 4 of the present disclosure.

Embodiment 4 of the present disclosure illustrates a skill transfer robot system which is capable of training the operator. FIG. 13 is a functional block diagram illustrating a configuration of a control system of the skill transfer robot system according to Embodiment 4 of the present disclosure. The robot system 400 of Embodiment 4 is different from the robot system 300 of Embodiment 3 in the following configuration, and other configurations thereof are the same as those of the robot system 300 of Embodiment 3. Below, this difference is described.

Referring to FIG. 13, the robot system 400 of Embodiment 4 further includes a switch part 75 which selectively connects and disconnects a communication path of the manual motion correcting instruction from the operation apparatus 2 to the motion instruction generating module 62 of the controller 3 (hereinafter, referred to as the "manual motion correcting instruction communication path"). The operation apparatus controlling module 42 controls operation of the switch part 75. Moreover, the automatic motion correcting instruction outputted from the learning module 52 is inputted to the operation apparatus controlling module 42.

The operation apparatus controlling module 42 has a training mode and a non-training mode. In the non-training mode, the operation apparatus controlling module 42 causes the switch part 75 to connect the manual motion correcting instruction communication path, and controls the operation apparatus 2 to output the manual motion correcting instruction according the operation of the operator while generating the reaction force according to the force data. Therefore, the robot system 400 operates so as to perform the given work.

On the other hand, in the training mode, the operation apparatus controlling module 42 causes the switch part 75 to disconnect the manual motion correcting instruction communication path. Then, the operation apparatus controlling module 42 causes the operation apparatus 2 to output the manual motion correcting instruction according the operation of the operator, and calculates a deviation of the manual motion correcting instruction from the automatic motion correcting instruction. Then, when the deviation is above a given value, the operation apparatus controlling module 42 controls the operation apparatus 2 so that the operation apparatus 2 carries out the operation to output the manual motion correcting instruction corresponding to the automatic motion correcting instruction. Note that, when the deviation is above the given value, the operation apparatus controlling module 42 may cause a suitable apparatus to generate warning. For example, it is configured so that a warning is emitted to the operator from a speaker (not illustrated). According to Embodiment 4, if the robot system 400 which has learned up to a practical-use level is used, the automatic motion correcting instruction which becomes a model is outputted from the learning module 52 when the robot system 400 is caused to perform the given work. On the other hand, in such a state, when the operator operates the operation apparatus 2, the operation apparatus controlling module 42 calculates a deviation of the manual motion correcting instruction by this operation from the automatic motion correcting instruction which becomes the model. Then, when the deviation is above the given value (i.e., when the operation of the operator is inappropriate more than a given level), the operation apparatus controlling module 42 controls the operation apparatus 2 so that the operation apparatus 2 carries out the operation to output the manual motion correcting instruction corresponding to the automatic motion correcting instruction which becomes the model. Therefore, the operator is guided by the operation apparatus 2 so that he/she carries out a suitable operation. Thus, an inexperienced operator can be trained suitably.

Note that, here, although the configuration in which the operator is guided by the operation apparatus 2 so that he/she carries out the suitable operation is realized by electric circuitry, this may be realized by hardware.

Embodiment 5

Figure 14:
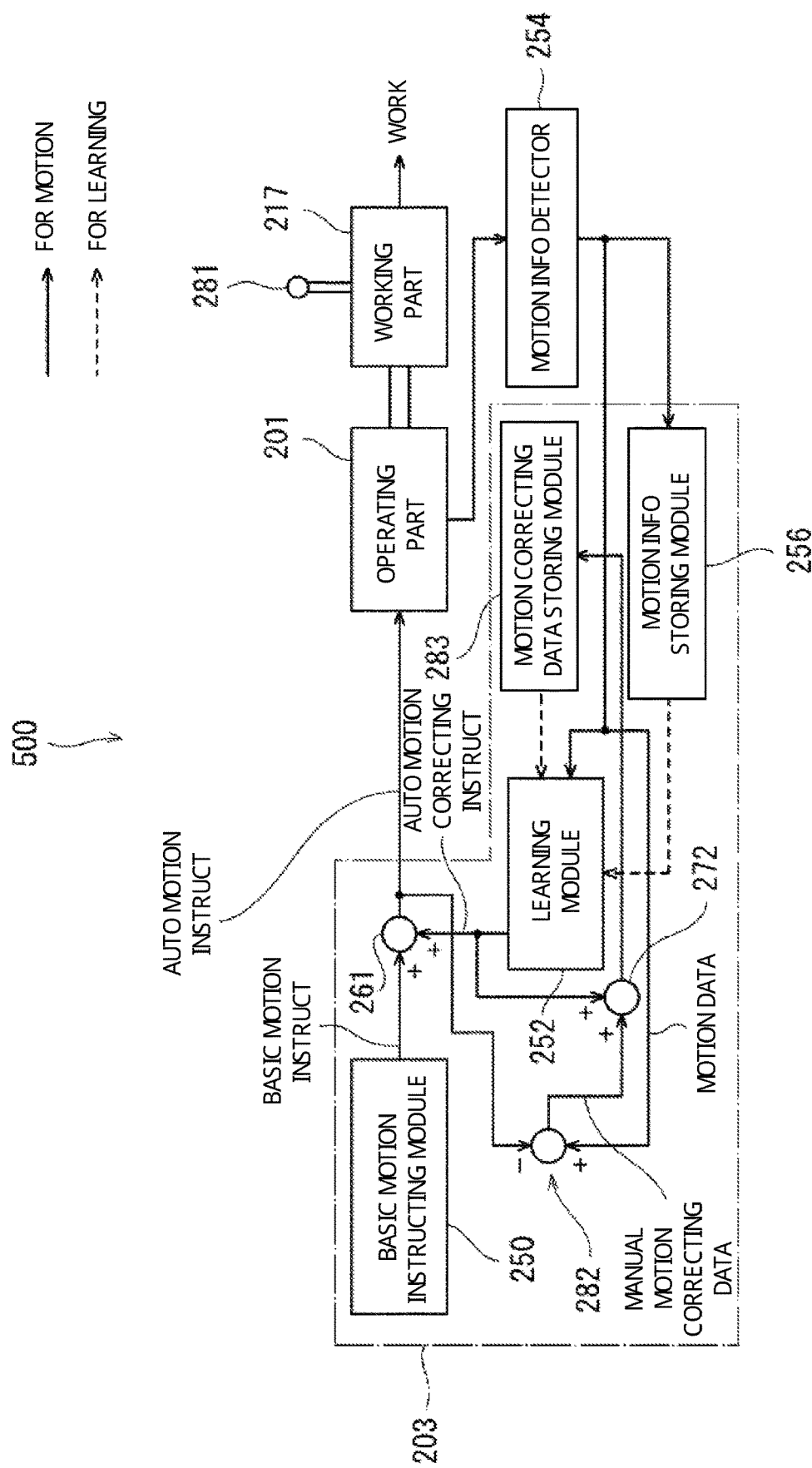
FIG. 14 is a functional block diagram illustrating a configuration of a skill transfer mechanical apparatus according to Embodiment 5 of the present disclosure.

Embodiment 5 of the present disclosure illustrates a guiding type skill transfer mechanical apparatus. FIG. 14 is a functional block diagram illustrating a configuration of a skill transfer mechanical apparatus 500 according to Embodiment 5 of the present disclosure. Referring to FIG. 14, the mechanical apparatus 500 of Embodiment 5 is different from the mechanical apparatus 100 of Embodiment 1 in the following configuration, and other configurations thereof are the same as those of the mechanical apparatus 100 of Embodiment 1.

In Embodiment 5, the motion information includes the motion data, and the motion data includes the force data indicative of the force which is applied to the work environment by the working part 217, and the positional data indicative of the position of the working part 217 during the operation of the operating part 201. Moreover, the working part 217 is provided with an manipulating part 281 for the operator physically applying a force directly to the working part 217. That is, in Embodiment 5, the manual motion correction is a correction of the motion of the working part 217 by the operator physically applying the force directly or indirectly to the working part 217. Moreover, a manual motion correcting data generator 282 generates the manual motion correcting data by subtracting the basic motion instruction from the motion data which is detected by the motion information detector 254 and reflects the manual motion correction.

According to Embodiment 5, the motion of the working part 217 can be corrected by the operator physically applying the force directly or indirectly to the working part 217. Therefore, the motion of the working part 217 can be corrected finely, even if it is a difficult work.

Embodiment 6

Figure 15:
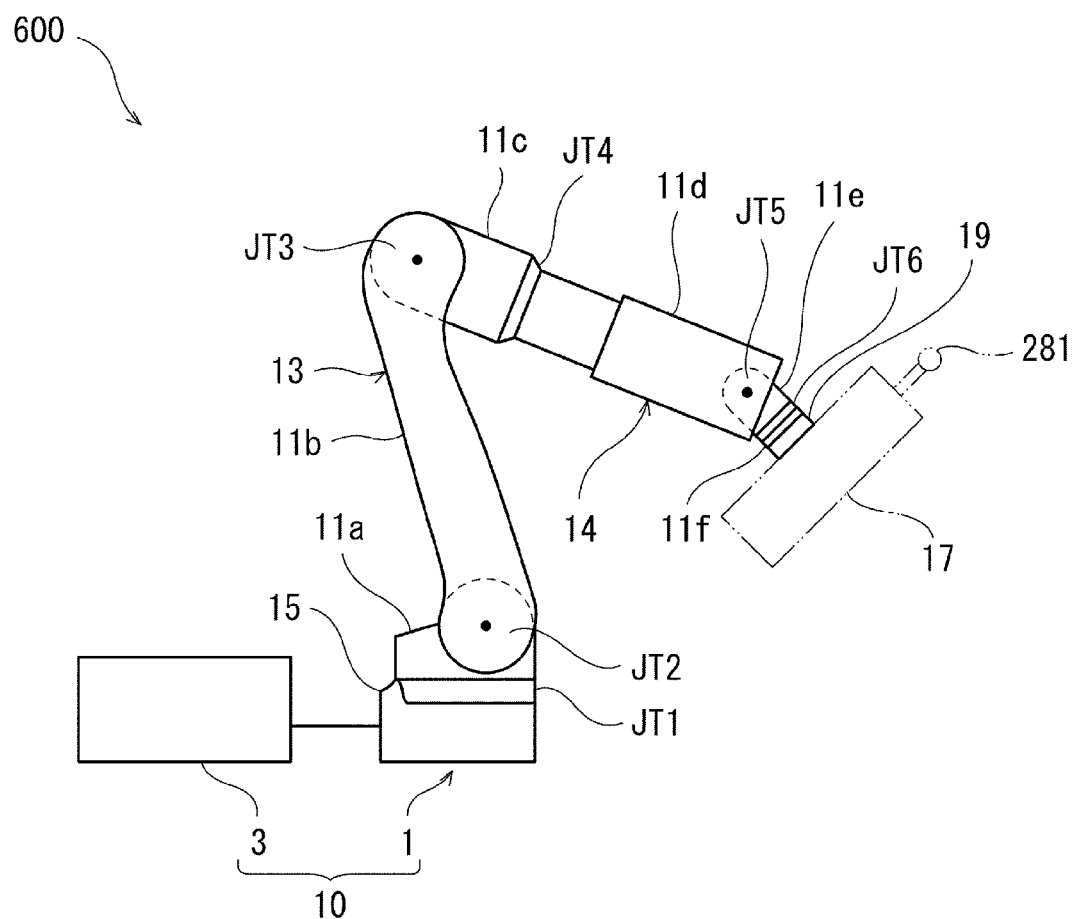
FIG. 15 is a schematic diagram illustrating a configuration of hardware of a skill transfer robot system according to Embodiment 6 of the present disclosure.
Figure 16:
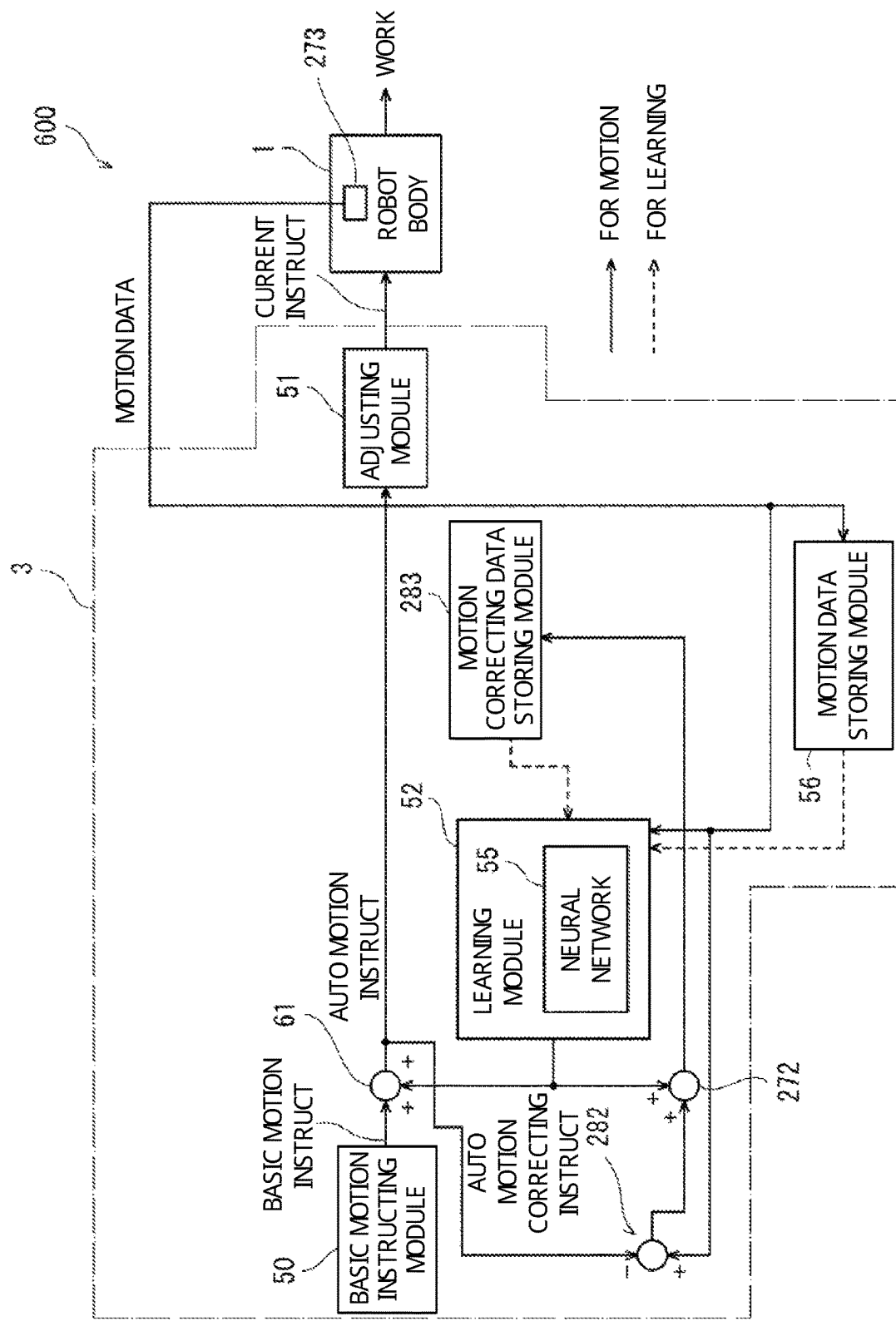
FIG. 16 is a functional block diagram illustrating a configuration of a control system of the skill transfer robot system of FIG. 15.

Embodiment 6 of the present disclosure illustrates a guiding type skill transfer robot system (hereinafter, may simply be referred to as "the robot system"). FIG. 15 is a schematic diagram illustrating a configuration of hardware of the skill transfer robot system 600 according to Embodiment 6 of the present disclosure. FIG. 16 is a functional block diagram illustrating a configuration of a control system of the skill transfer robot system 600 of FIG. 15. Referring to FIGS. 15 and 16, in Embodiment 6, the mechanical apparatus 100 of Embodiment 1 is a robot 10 including a robot body 1 as the operating part which has an end effector 17 as the working part and moves the end effector 17 so that the end effector 17 performs a work to the work target object, and a controller 3 which controls operation of the robot body 1, and the basic motion instructing module 50 is configured so as to output the basic motion instruction for causing the end effector 17 to carry out the basic motion by the robot body 1. Moreover, the learning module 52 is configured so as to carry out the machine learning of the motion correcting data stored in a motion correcting data storing module 283 by using the motion data stored in the motion data storing module 56, and, after the machine learning is finished, accept an input of the motion data during the operation of the robot body 1, and output the automatic motion correcting instruction. Moreover, the robot body 1 is configured so as to move the end effector 17 according to the automatic motion instruction based on the basic motion instruction and the automatic motion correcting instruction, and the manual motion correction.

In detail, in the robot system 600, the end effector 17 is provided with a manipulating part 281. Note that the manipulating part 281 may be omitted and the operator may directly apply a force to the work target object.

Moreover, the controller 3 includes the basic motion instructing module 50, the automatic motion instruction generating module 61, the adjusting module 51, the manual motion correcting data generator 282, the motion correcting data generator 272, the motion correcting data storing module 283, and the motion data storing module 56.

Next, operation of the robot system 600 constituted as described above is described.

Referring to FIGS. 15 and 16, in the robot system 600, the controller 3 reduces (weakens) the rigidity in the operation of the robot body 1 to the extent in which the end effector 17 moves when the operator applies the force to the end effector 17. Then, the basic motion instructing module 50 outputs the basic motion instruction during the operation of the robot body 1. On the other hand, the learning module 52 outputs the automatic motion correcting instruction. The automatic motion instruction generating module 61 adds the automatic motion correcting instruction to the basic motion instruction to generate the automatic motion instruction. The adjusting module 51 generates the current instruction based on the automatic motion instruction, and outputs it to the robot body 1. The robot body 1 operates so that the end effector 17 is moved according to the current instruction.

On the other hand, when the operator operates the manipulating part 281 of the end effector 17 as needed, the end effector 17 moves according to this operation. Therefore, the end effector 17 moves according to the basic motion instruction, the automatic motion correcting instruction, and the manual motion correction instruction.

On the other hand, the motion data detector 273 detects the motion data of the robot body 1 corresponding to the motion of the end effector 17. The motion data storing module 56 stores this detected motion data. Moreover, the manual motion correcting data generator 282 subtracts the automatic motion instruction from the motion data to generate the manual motion correcting data. Then, the motion correcting data generator 272 adds the manual motion correcting data to the automatic motion correcting instruction to generate the motion correcting data. The motion correcting data storing module 283 stores this motion correcting data.

On the other hand, the motion data is inputted into the learning module 52. When the motion data is inputted, the learning module 52 outputs the predicted motion correcting data reflecting the last contents of the learning as the automatic motion correcting instruction.

Then, during the learning of the learning module 52, the learning module 52 carries out the machine learning of the learning motion correcting data stored in the motion correcting data storing module 283 by using the learning motion data stored in the motion data storing module 56.

Then, during the next operation of the robot body 1, the learning module 52 outputs the predicted motion correcting data reflecting the current contents of the learning as the next automatic motion correcting instruction.

Note that, since the learning method of the learning module 52 is similar to that of the robot system 300 of Embodiment 3, the description thereof is omitted.

According to Embodiment 6, a guiding type skill transfer robot system can be realized. In detail, by the operator physically applying the force directly or indirectly to the end effector 17, the motion of the end effector 17 can be corrected. Thus, the motion of the working part can be corrected finely, even if it is a difficult work.

[Bilateral Control]

In Embodiment 6, any of the bilateral controls is applicable. Here, for example, the force reflection type bilateral control is applied. In the force reflection type bilateral control, the "motion instruction" and the "motion correcting instruction" include only the "positional instruction" and the "position correcting instruction."

[Application to Other Mechanical Apparatuses]

In Embodiment 6, by replacing each element of the robot system 600 with each corresponding element of other mechanical apparatuses, the contents of Embodiment 6 are easily applicable to other mechanical apparatuses.

Embodiment 7

Embodiment 7 of the present disclosure illustrates scaling of a distance and scaling of a force in Embodiments 2 to 4.

(1) Scaling of Traveling Distance

With a manipulation apparatus, the motion instruction is given to work machinery (including industrial robots, such as a manipulator), and the work machinery actuates. For example, the manipulation apparatus is provided with a manipulandum which is linearly displaceable in the front-and-rear direction. The operator can move a wrist of the manipulator by operating the manipulandum. The wrist displaces proportional to the displacement of the manipulandum. In a certain setting, when the manipulandum is displaced forward by 1 cm, the wrist is displaced forward by 10 cm. At this time, a displacement ratio is 1:10. This displacement ratio can be arbitrarily set within a given range (e.g., 1:1 to 1:100).

In other settings, when the manipulandum is displaced forward by 10 cm, the wrist is displaced forward by 1 cm. At this time, the displacement ratio is 10:1. This displacement ratio can be arbitrarily set within a given range (e.g., 1:1 to 100:1).

(2) Scaling of Force

With the manipulation apparatus (including a master robot), the motion instruction is given to the work machinery (including an industrial robot and a slave robot, such as a manipulator), and the work machinery actuates. The manipulation apparatus is provided with a control lever to which a force sensor is attached. The wrist of the manipulator can be driven by the operator operating the manipulandum. A hand for performing a specific work to a workpiece is attached to the wrist. A force sensor is attached to the hand and the hand can detect a force applied to the workpiece. The output of the force sensor of the hand is fed back to a controller which drives and controls the manipulator, and current of a motor of a joint axis of the manipulator is controlled so that a preset force is applied to the workpiece by the hand. In a certain setting, when a force of 1N is applied to the control lever (in general, by the operator), the motor current is controlled so that the hand applies a force of 10N to the workpiece. At this time, a force ratio is 1:10. This force ratio can be arbitrarily set within a given range (e.g., 1:1 to 1:100).

In other settings, when a force of 10N is applied to the control lever, the motor current is controlled so that the hand applies a force of 1N to the workpiece. At this time, the force ratio is 10:1. This force ratio can be arbitrarily set within a given range (e.g., 1:1 to 100:1).

Embodiment 8

Embodiment 8 of the present disclosure illustrates a configuration in which a plurality of work machinery are driven by a manipulation apparatus for one person, a manipulation with both hands and both feet, and a manipulation of an external axis in Embodiments 2 to 4 and 7.

With one set of manipulation apparatus configured to be operated by one operator, a plurality of work machinery (including an industrial work robot, such as a manipulator) can be controlled. The manipulation apparatus is provided with a control lever A for being operated with a left hand and a control lever B for being operated with a right hand A manipulator A is operated by the control lever A and a manipulator B is operated by the control lever B. The two manipulators A and B are disposed close to each other so that they can jointly perform a work to a single workpiece. A hand which can grasp and hold the workpiece is attached to a wrist of the manipulator A. A paint gun is attached to a wrist of the manipulator B. The operator can arbitrarily set and change the position and angle of the workpiece within a given range by operating the control lever A. Moreover, the operator can arbitrarily set and change the position and angle of the paint gun within a given range by operating the control lever B. The operator can uniformly paint the surface of the workpiece, while freely setting and changing the position and angle of the workpiece, and freely setting and changing the position and angle of the paint gun.

The manipulation apparatus may be further provided with a pedal A for a left leg and a pedal B for a right leg. ON/OFF of paint spraying from the paint gun is controllable by the pedal A.

When the pedal B is depressed, the manipulators A and B carry out an emergency stop.

ON/OFF control of paint spraying from the paint gun is performed by an external axis A. That is, the external axis A is controlled by the pedal A.

Embodiment 9

Figure 17:
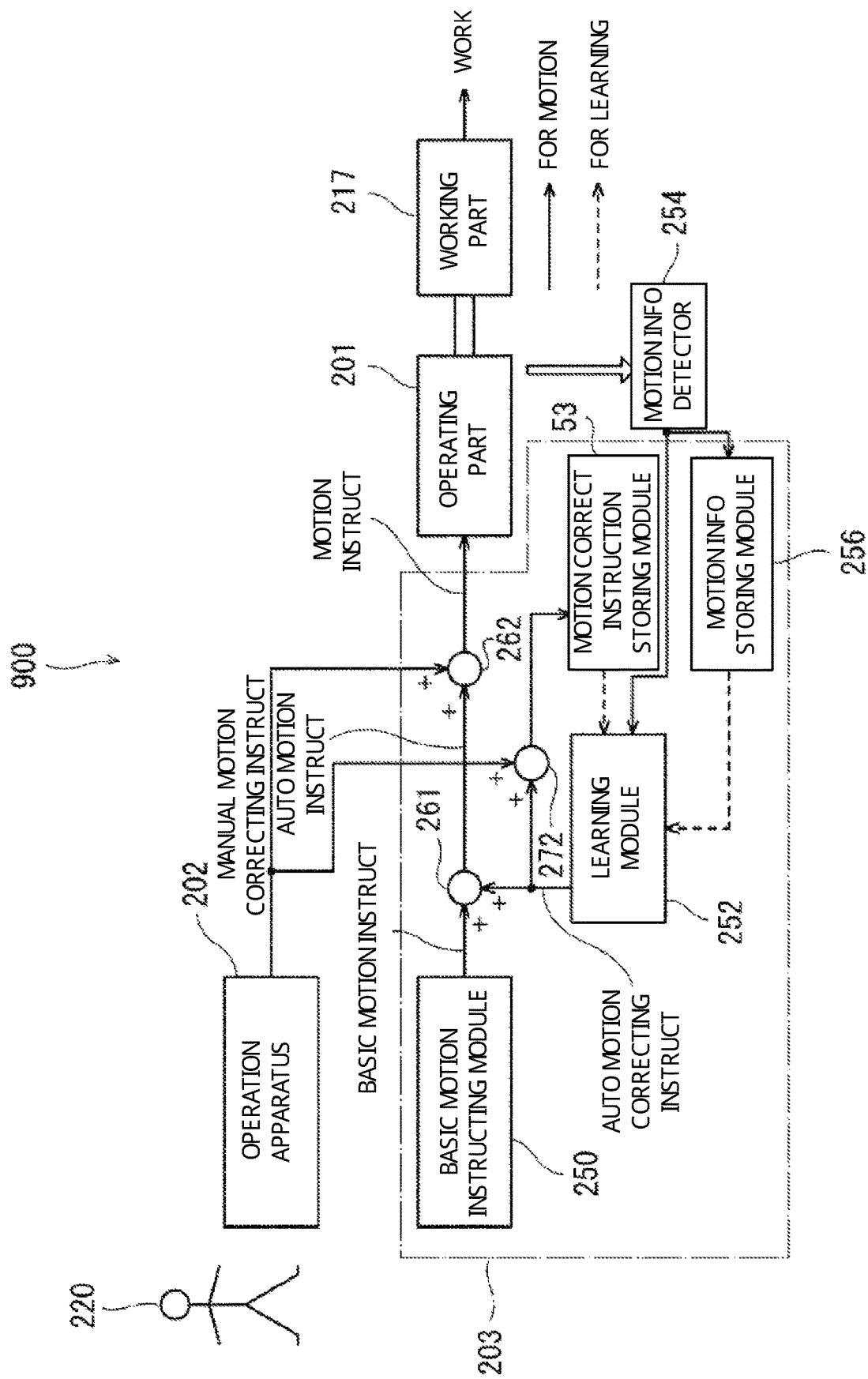
FIG. 17 is a block diagram illustrating a configuration of a skill transfer mechanical apparatus according to Embodiment 9 of the present disclosure.

Embodiment 9 of the present disclosure illustrates an operating type skill transfer mechanical apparatus in which the motion information does not include the force data indicative of a force which is applied to the work environment by the working part. FIG. 17 is a block diagram illustrating a configuration of the skill transfer mechanical apparatus according to Embodiment 9 of the present disclosure. The skill transfer mechanical apparatus 900 of Embodiment 9 is different from the skill transfer mechanical apparatus 100 of Embodiment 1 in the following configuration, and other configurations thereof are the same as those of the skill transfer mechanical apparatus 100 of Embodiment 1. Below, this difference is described.

Referring to FIG. 17, in the mechanical apparatus 900 of Embodiment 9, the manual motion correcting data generator 271 of Embodiment 1 is the operation apparatus 202 which outputs the manual motion correcting instruction according the operation of the operator 220 as the manual motion correcting data. In the mechanical apparatus 900, the motion correcting data generator 272 of Embodiment 1 is the motion correcting instruction generator 272 which adds the manual motion correcting instruction to the automatic motion correcting instruction to generate the motion correcting instruction, the motion correcting data storing module 253 is the motion correcting instruction storing module 53 which stores the motion correcting instruction, and the learning module 252 is configured so as to carry out the machine learning of the motion correcting instruction stored in the motion correcting instruction storing module 53 by using the motion information stored in the motion information storing module 256, and after the machine learning is finished, accept an input of the motion information during the operation of the operating part 201, and output the automatic motion correcting instruction.

Moreover, in the mechanical apparatus 900, the operating part 201 is configured to move the working part 217 according to the automatic motion instruction based on the basic motion instruction and the automatic motion correcting instruction, and the manual motion correcting instruction.

Organizing the above differences, the mechanical apparatus 900 of Embodiment 9 includes the operating part 201 which has the working part 217 and moves the working part 217 so as to perform the work, the controller 203 which controls the operation of the operating part 201, the motion information detector 254 which detects the motion information on the operating part 201 corresponding to the motion of the working part 217, and the operation apparatus 202 which outputs the manual motion correcting instruction according the operation of the operator 220. The controller 203 includes the basic motion instructing module 250 which outputs the basic motion instruction for causing the working part 217 to carry out the basic motion by the operating part 201, the learning module 252 which outputs the automatic motion correcting instruction, the motion correcting instruction generator 272 which adds the manual motion correcting instruction to the automatic motion correcting instruction to generate the motion correcting instruction, the motion correcting instruction storing module 53 which stores the motion correcting instruction, and the motion information storing module 256 which stores the motion information. The learning module 252 is configured to carry out the machine learning of the motion correcting instruction stored in the motion correcting instruction storing module 53 by using the motion information stored in the motion information storing module 256, and after the machine learning is finished, accept an input of the motion information during the operation of the operating part 201, and output the automatic motion correcting instruction, and the operating part 201 is configured to move the working part 217 according to the automatic motion instruction based on the basic motion instruction and the automatic motion correcting instruction, and the manual motion correcting instruction.

According to Embodiment 9, by the operator 220 operating the operation apparatus 202, the motion of the working part 217 can be corrected. Therefore, the operator 220 can manipulate the operating part 201 at a position distant from the working part 217.

Note that, in Embodiment 9, since the motion information does not include the force data indicative of the force which is applied to the work environment by the working part 217, the mechanical apparatus 900 of Embodiment 9 is different from the mechanical apparatus 200 of Embodiment 2 in that the motion information presenting mechanism 206 of FIG. 2 is not provided.

Embodiment 10

Figure 18:
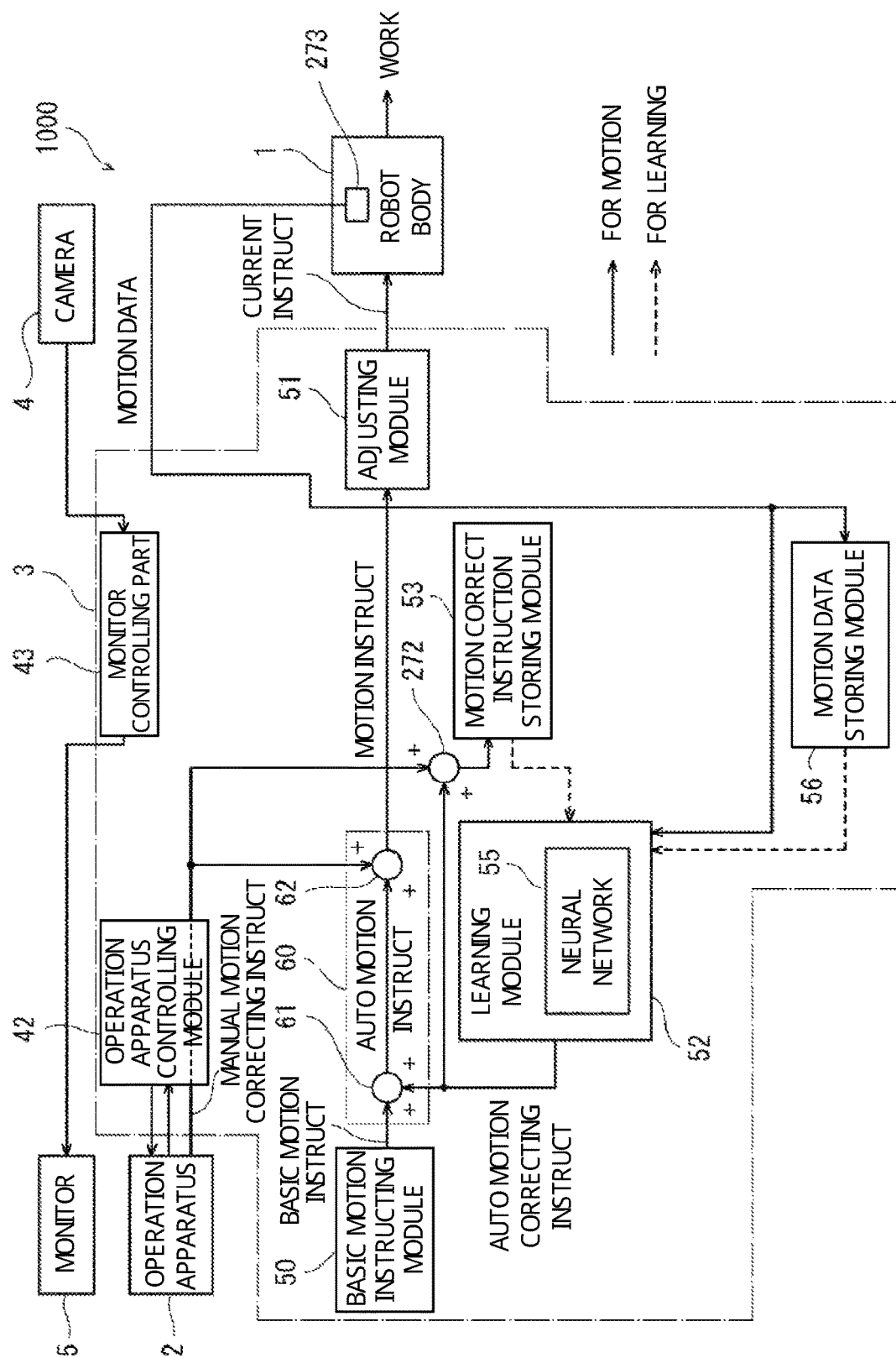
FIG. 18 is a functional block diagram illustrating a configuration of a control system of a skill transfer robot system according to Embodiment 10 of the present disclosure.

Embodiment 10 of the present disclosure illustrates an operating type skill transfer robot system in which the motion information does not include the force data indicative of a force which is applied to the work environment by the working part. FIG. 18 is a functional block diagram illustrating a configuration of a control system of the skill transfer robot system according to Embodiment 10 of the present disclosure.

Referring to FIG. 18, the robot system 1000 of Embodiment 10 is what implements the mechanical apparatus 900 as the robot system 1000 as one example of the mechanical apparatus 900 of Embodiment 9. On the other hand, the robot system 300 of Embodiment 3 is what implements the mechanical apparatus 200 as the robot system 300 as one example of the mechanical apparatus 200 of Embodiment 2.

Therefore, as comparing the robot system 1000 of Embodiment 10 with the robot system 300 of Embodiment 3, the robot system 1000 is different from the robot system 300 in that the motion data does not include the force data indicative of a force which is applied to the work target object by the end effector 17 (see FIG. 3), and therefore, the force data is not inputted into the operation apparatus controlling module 42 of the controller 3, and therefore, the controller 3 does not perform the bilateral control but performs the position control of the robot body 1.

The hardware configuration of the robot system 1000 is as illustrated in FIG. 3. Referring to FIG. 3, the robot system 1000 of Embodiment 10 is different from the mechanical apparatus 900 of Embodiment 9 in the following configuration, and other configurations thereof are the same as those of the mechanical apparatus 900 of Embodiment 9. Below, this difference is described.

In Embodiment 10, the mechanical apparatus 900 of Embodiment 9 is configured as the robot system 1000 provided with the robot 10 having the robot body 1 as the operating part 201 which has the end effector 17 as the working part 217 and moves the end effector 17 so that the end effector 17 performs the work to the work target object, and the controller 3 which controls the operation of the robot body 1, and the operation apparatus 2 which outputs the manual motion correcting instruction according the operation of the operator.

In the robot systems 1000, the basic motion instructing module 50 is configured to output the basic motion instruction for causing the end effector 17 to carry out the basic motion by the robot body 1, and the learning module 52 is configured to carry out the machine learning of the motion correcting instruction stored in the motion correcting instruction storing module 53 by using the motion data stored in the motion data storing module 56, and after the machine learning is finished, accept an input of the motion data during the operation of the robot body 1, and output the automatic motion correcting instruction.

Moreover, the robot body 1 is configured to move the end effector 17 according to the automatic motion instruction based on the basic motion instruction and the automatic motion correcting instruction, and the manual motion correcting instruction.

According to this configuration, the operating type skill transfer robot system 1000 which does not use the force data can be realized. In detail, by the operator operating the operation apparatus 2, the motion of the end effector 17 can be corrected. Therefore, the operator can manipulate the robot body 1 at a position distant from the robot body 1.

Since the detailed configuration and operation of the robot system 1000 are the same as the configuration and operation of the robot system 300 of Embodiment 3 except for their differences, the description thereof is omitted.

According to the robot system 1000, similar effects to the robot system 300 of Embodiment 3 are acquired.

The robot 10 of Embodiment 10 includes a painting robot, a welding robot, and a picking (extracting) robot.

In Embodiment 10, by replacing each element of the robot system 1000 with each corresponding element of other mechanical apparatuses, the contents of Embodiment 10 are easily applicable to other mechanical apparatuses.

Embodiment 11

Figure 19:
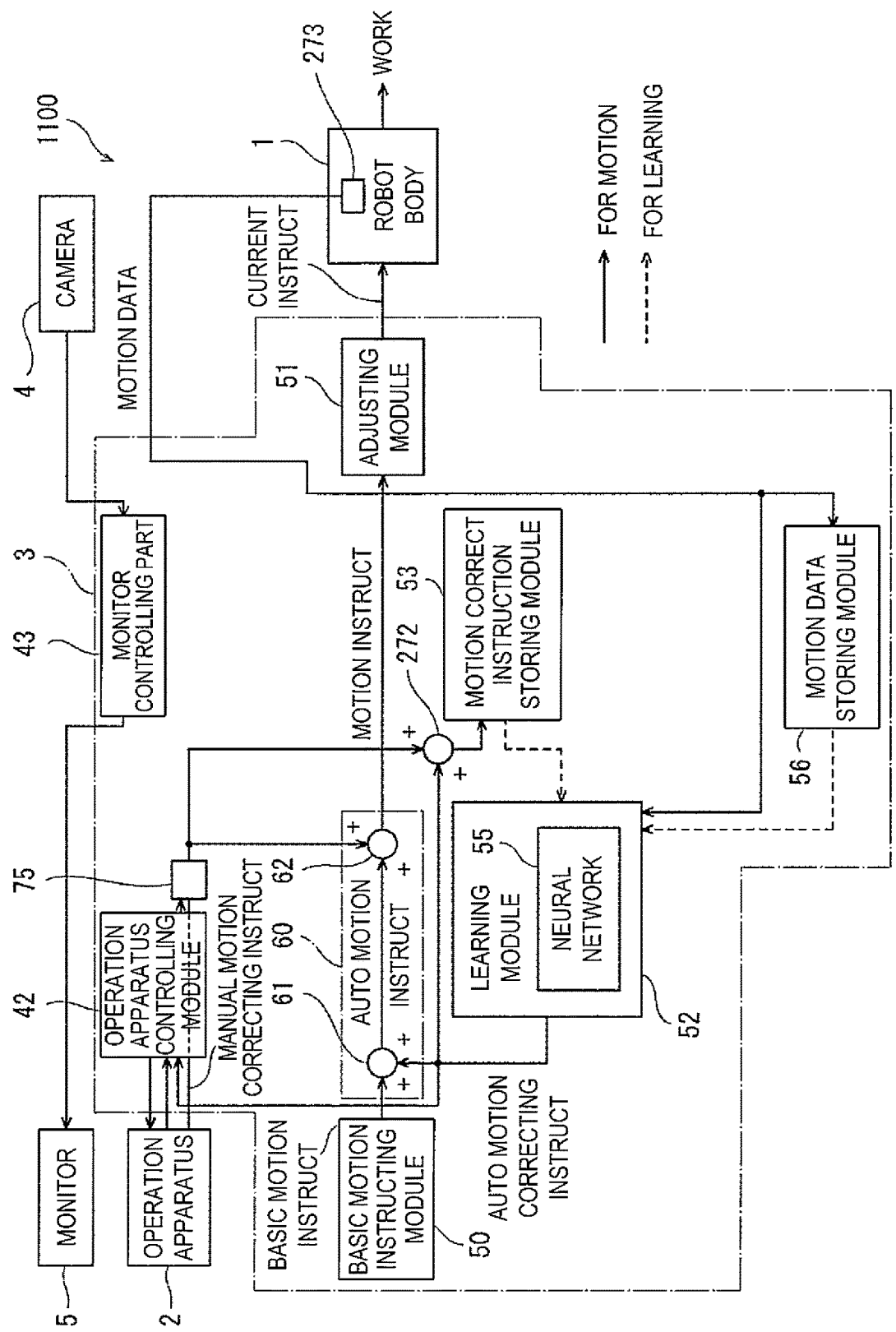
FIG. 19 is a functional block diagram illustrating a configuration of a control system of a skill transfer robot system according to Embodiment 11 of the present disclosure.

Embodiment 11 of the present disclosure illustrates a skill transfer robot system which is capable of training the operator by using the robot system 1000 of Embodiment 10. FIG. 19 is a functional block diagram illustrating a configuration of a control system of the skill transfer robot system 1100 according to Embodiment 11.

Referring to FIG. 19, the robot system 1100 of Embodiment 11 is different from the robot system 1000 of Embodiment 10 in the following configuration, and other configurations thereof are the same as those of the robot system 1000 of Embodiment 10. Below, this difference is described.

Referring to FIG. 19, the robot system 1100 of Embodiment 11 further includes the switch part 75 which selectively connects and disconnects the manual motion correcting instruction communication path from the operation apparatus 2 to the motion instruction generating module 62 of the controller 3. The operation apparatus controlling module 42 controls the operation of the switch part 75. Moreover, the automatic motion correcting instruction outputted from the learning module 52 is inputted into the operation apparatus controlling module 42.

The operation apparatus controlling module 42 has the training mode and the non-training mode. In the non-training mode, the operation apparatus controlling module 42 causes the switch part 75 to connect the manual motion correcting instruction communication path, and controls the operation apparatus 2 so as to output the manual motion correcting instruction according the operation of the operator. Therefore, the robot system 1100 operates so as to perform the given work.

On the other hand, in the training mode, the operation apparatus controlling module 42 causes the switch part 75 to disconnect the manual motion correcting instruction communication path. Then, while causing the operation apparatus 2 to output the manual motion correcting instruction according the operation of the operator, the operation apparatus controlling module 42 calculates the deviation of the manual motion correcting instruction from the automatic motion correcting instruction. Then, when the deviation is above the given value, the operation apparatus controlling module 42 controls the operation apparatus 2 to carry out the operation to output the manual position correcting instruction corresponding to the automatic motion correcting instruction. Note that, the operation apparatus controlling module 42 may be configured to cause the suitable apparatus to generate warning, when the deviation is above the given value. For example, it is configured so that a warning is emitted to the operator with the speaker (not illustrated).

According to Embodiment 11, similar effects to Embodiment 4 are acquired.

Embodiment 12

Embodiment 12 of the present disclosure illustrates a configuration in which the program learned by the learning module of the operating type skill transfer robot is stored in a storing module of another robot, and the operator is trained by using this robot.

For example, the program learned by the learning module 52 of the robot system 300 of Embodiment 3 or the robot system 1000 of Embodiment 10 is stored in a storing module of another robot which does not have the learning function. Then, the robot is provided with an operation apparatus controlling module similar to the operation apparatus controlling module 42 of the robot system 400 of Embodiment 4 or the robot system 1100 of Embodiment 11. For example, "another robot system which does not have the learning function" includes the robot system 300 of Embodiment 3 or the robot system 1000 of Embodiment 10 from which the configuration related to the learning function is omitted.

Therefore, the operator can be trained by using the robot which does not have the learning function.

It is apparent for a person skilled in the art that many improvements and other embodiments of the present disclosure are possible from the above description. Therefore, the above description is to be interpreted only as illustration, and it is provided in order to teach a person skilled in the art the best mode that implements the present disclosure. The details of the structures and/or the functions may be substantially changed, without departing from the spirit of the present disclosure.

INDUSTRIAL APPLICABILITY

The skill transfer mechanical apparatus of the present disclosure is useful as the skill transfer mechanical apparatus capable of transferring the skilled worker's skill in the industry, and achieving the automation of the given work in a short period of time.

DESCRIPTION OF REFERENCE CHARACTERS

1 Robot Body
2 Operation Apparatus
3 Controller
4 Camera
5 Monitor
10 Robot
17 End Effector
19 Force Sensor
42 Operation Apparatus Controlling Module
50 Basic Motion Instructing Module
51 Adjusting Module
52 Learning Module
53 Motion Correcting Instruction Storing Module
55 Neural Network
56 Motion Data Storing Module
60 Motion Instruction Generating Module
61 Automatic Motion Instruction Generating Module
62 Motion Instruction Generating Module
72 Data Input Module
73 Learning Evaluating Module
65 Switch Part
81 First Object
82 Second Object
100 Mechanical Apparatus (Skill Transfer Mechanical Apparatus)
200, 500, 900 Mechanical Apparatus (Skill Transfer Mechanical Apparatus)
201 Operating Part
202 Operation Apparatus
203 Controller
206 Motion Information Presenting Mechanism
217 Working Part
250 Basic Motion Instructing Module 252 Learning Module
253 Motion Correcting Data Storing Module
254 Motion Information Detector
256 Motion Information Storing Module
271 Manual Motion Correcting Data Generator
272 Motion Correcting Data Generator (Motion Correcting Instruction Generator)
273 Motion Data Detector
281 Manipulating Part
282 Manual Motion Correcting Data Generator
283 Motion Correcting Data Storing Module
300, 400, 600, 1000, 1100 Robot System (Skill Transfer Robot System)

The invention claimed is:

1. A skill transfer apparatus, comprising:
a circuitry including a memory and a learning model, and configured to control operation of an operating part that controls a working part, in accordance with an operation program;
wherein the circuitry is configured to perform:
outputting a basic motion instruction for causing the working part to carry out a basic motion by the operating part in accordance with the operation program;
receiving, from an inputter, a manual motion correcting instruction according to an operation input by the operator on the inputter;
receiving, from a detector, motion information regarding the operation of the operating part corresponding to the motion of the working part, the motion information comprising force data indicative of a force applied to a work environment by the working part, and position data indicative of a position of the working part during operation;
inputting the motion information to the learning model and outputting an automatic motion correcting instruction by using an output result of the learning model;
controlling the operation of the operating part to cause the operating part to move the working part in accordance with the manual motion correcting instruction and the automatic motion correcting instruction;
adding the manual motion correcting instruction to the automatic motion correcting instruction to generate a combined motion correcting instruction; and
storing the combined motion correcting instruction and the motion information in the memory,
wherein by machine learning, the circuitry updates the learning model by causing the learning model to carry out the machine learning of the combined motion correcting instruction stored in the memory by using the motion information stored in the memory, and
wherein after the machine learning of the learning model, the circuitry inputs the motion information to the updated learning model during the operation of the operating part, and outputs an updated version of the automatic motion correcting instruction by using an output result of the updated learning model.

2. The skill transfer apparatus of claim 1, wherein the skill transfer apparatus is a mechanical system including:
machinery comprising:
a machinery body as the operating part having an end effector part as the working part and configured to move the end effector part so that the end effector part performs work on a work target object; and
the circuitry, and the circuitry being configured to control the operation of the machinery body; and
the inputter,
wherein the circuitry outputs the basic motion instruction for causing the end effector part to carry out a basic motion,
wherein the circuitry causes the machinery body to move the end effector part according to the automatic motion correcting instruction, and the manual motion correcting instruction.

3. The skill transfer apparatus of claim 2, wherein the detector is provided with the machinery body,
wherein the detector detects the motion information of the end effector part during the operation of the machinery body, and the detector outputs the motion information,
wherein the circuitry stores the motion information of the end effector part in the memory.

4. The skill transfer apparatus of claim 3,
wherein the circuitry is configured to selectively connect and disconnect a communication path of the manual motion correcting instruction from the inputter to the circuitry, and
wherein when the circuitry disconnects the communication path, the circuitry accepts training of the operation of the operator by using the inputter.

5. The skill transfer apparatus of claim 4,
wherein the circuitry is configured to control the operation of the inputter by using at least the automatic motion correcting instruction,
wherein the circuitry is configured to carry out control in a training mode and control in a non-training mode,
wherein in the non-training mode, the circuitry connects the communication path, and controls the inputter to output the manual motion correcting instruction according to at least the operation input by the operator,
wherein in the training mode, the circuitry disconnects the communication path and causes the inputter to output the manual motion correcting instruction according to the operation input by the operator, and
wherein the circuitry calculates a deviation of the manual motion correcting instruction from the automatic motion correcting instruction, and when the deviation is above a given value, controls the inputter to carry out an operation of outputting the manual motion correcting instruction corresponding to the automatic motion correcting instruction.

6. The skill transfer apparatus of claim 1, further comprising a motion information presenting mechanism configured to present the motion information to the operator so that the operator is able to perceive the motion information.

7. The skill transfer apparatus of claim 6, wherein the skill transfer apparatus is a mechanical system including:
machinery comprising:
a machinery body as the operating part having an end effector part as the working part and configured to move the end effector part so that the end effector part performs work on a work target object; and
the circuitry, and the circuitry being configured to control the operation of the machinery body; and
the inputter, also serving as the motion information presenting mechanism, configured to output the manual motion correcting instruction according to the operation input by the operator, while generating a reaction force according to the force data as the motion information indicative of a force applied to the work target object by the end effector part of the machinery body, wherein the circuitry outputs the basic motion instruction for causing the end effector part to carry out the basic motion wherein the circuitry causes the machinery body to move the end effector part according to the automatic motion correcting instruction, and the manual motion correcting instruction.

8. The skill transfer apparatus of claim 7, wherein the detector includes a first detector and a second detector which are provided to the machinery body, wherein the first detector:
 detects the force data indicative of the force applied to the work target object by the end effector part and outputs the force data as part of the motion information, wherein the second detector:
 detects the positional data indicative of a position of the end effector part during the operation of the machinery body and outputs the positional data as part of the motion information, wherein the circuitry stores the force data and the positional data as the motion information in the memory.

9. The skill transfer apparatus of claim 8,
 wherein the circuitry is configured to selectively connect and disconnect a communication path of the manual motion correcting instruction from the inputter to the circuitry,
 wherein the circuitry is configured to control operation of the inputter by using the force data and the automatic motion correcting instruction,
 wherein the circuitry is configured to carry out control in a training mode and control in a non-training mode,
 wherein in the non-training mode, the circuitry connects the communication path, and controls the inputter to output the manual motion correcting instruction according to the operation input by the operator, while generating a reaction force according to the force data,
 wherein in the training mode, the circuitry disconnects the communication path, and controls the inputter to output the manual motion correcting instruction according to the operation input by the operator, and
 wherein the circuitry calculates a deviation of the manual motion correcting instruction from the automatic motion correcting instruction, and when the deviation is above a given value, controls the inputter to carry out an operation of outputting the manual motion correcting instruction corresponding to the automatic motion correcting instruction.

10. The skill transfer apparatus of claim 9, wherein the circuitry controls the inputter in the training mode to output the manual motion correcting instruction according to the operation input by the operator, while generating a reaction force according to the force data.

11. The skill transfer apparatus of claim 2,
 wherein the machinery body is configured to operate according to a current instruction, and
 wherein the circuitry is configured to output the current instruction based on the combined motion correcting instruction.

12. The skill transfer apparatus of claim 2, wherein the end effector part is an end effector, the machinery body is a robot body, the machinery is a robot, and the mechanical system is a robot system.

13. A computer readable non-transitory storage medium that stores a program, the program including a learning model, the program when executed causing a computer with a memory to control operation of an operating part that controls a working part and execute steps comprising:

outputting a basic motion instruction for causing the working part to carry out a basic motion by the operating part in accordance with the program;

receiving, from an inputter, a manual motion correcting instruction according to an operation input by the operator on the inputter;

receiving, from a detector, motion information regarding the operation of the operating part corresponding to the motion of the working part, the motion information comprising force data indicative of a force applied to a work environment by the working part, and position data indicative of a position of the working part during operation;

inputting the motion information to the learning model and outputting an automatic motion correcting instruction by using an output result of the learning model;

controlling the operation of the operating part to cause the operating part to move the working part in accordance with the manual motion correcting instruction and the automatic motion correcting instruction;

adding the manual motion correcting instruction to the automatic motion correcting instruction to generate a combined motion correcting instruction; and storing the combined motion correcting instruction and the motion information in the memory, wherein by machine learning, the program updates the learning model by causing the learning model to carry out the machine learning of the combined motion correcting instruction stored in the memory by using the motion information stored in the memory, and wherein after the machine learning of the learning model, the program inputs the motion information to the updated learning model during the operation of the operating part, and outputs an updated version of the automatic motion correcting instruction by using an output result of the updated learning model.

14. A method of controlling a computer with a memory that stores a program to control operation of an operating part that controls a working part, the method comprising:

outputting a basic motion instruction for causing the working part to carry out a basic motion by the operating part in accordance with the program;

receiving, from an inputter, a manual motion correcting instruction according to an operation input by the operator on the inputter;

receiving, from a detector, motion information regarding the operation of the operating part corresponding to the motion of the working part, the motion information comprising force data indicative of a force applied to a work environment by the working part, and position data indicative of a position of the working part during operation;

inputting the motion information to a learning model and outputting an automatic motion correcting instruction by using an output result of the learning model;

controlling the operation of the operating part to cause the operating part to move the working part in accordance with the manual motion correcting instruction and the automatic motion correcting instruction;

adding the manual motion correcting instruction to the automatic motion correcting instruction to generate a combined motion correcting instruction; and storing the combined motion correcting instruction and the motion information in the memory, wherein by machine learning, the program updates the learning model by causing the learning model to carry out the machine learning of the combined motion correcting instruction stored in the memory by using the motion information stored in the memory, and wherein after the machine learning of the learning model, the program inputs the motion information to the updated learning model during the operation of the operating part, and outputs an updated version of the automatic motion correcting instruction by using an output result of the updated learning model.

15. A method of controlling a computer with a memory that stores a program to control operation of an operating part that controls a working part, the computer being integrated with a mechanical system including machinery comprising a machinery body as the operating part and having an end effector part as the working part and configured to move the end effector part so that the end effector part performs work on a work target object, the computer being configured to control operation of the machinery body, the machinery further including an inputter, the method comprising:

outputting a basic motion instruction for causing the end effector to carry out a basic motion by the operating part in accordance with the program;

receiving, from the inputter, a manual motion correcting instruction according to an operation input by the operator on the inputter;

receiving, from a detector integrated with the machine body, motion information regarding the operation of the operating part corresponding to the motion of the working part, the motion information comprising force data indicative of a force applied to a work environment by the working part, and position data indicative of a position of the working part during operation;

inputting the motion information to a learning model and outputting an automatic motion correcting instruction by using an output result of the learning model;

controlling the operation of the operating part to cause the operating part to move the working part in accordance with the manual motion correcting instruction and the automatic motion correcting instruction;

adding the manual motion correcting instruction to the automatic motion correcting instruction to generate a combined motion correcting instruction; and storing the combined motion correcting instruction and the motion information in the memory, wherein by machine learning, the program updates the learning model by causing the learning model to carry out the machine learning of the combined motion correcting instruction stored in the memory by using the motion information stored in the memory, wherein after the machine learning of the learning model, the program inputs the motion information to the updated learning model during the operation of the operating part, and outputs an updated version of the automatic motion correcting instruction by using an output result of the updated learning model, and causing the machinery body to move the end effector part according to the automatic motion correcting instruction, and the manual motion correcting instruction, detecting, with the detector, the motion information of the end effector part during the operation of the machinery body, and outputting the motion information, storing the motion information of the end effector part in the memory, selectively connecting and disconnecting a communication path of the manual motion correcting instruction from the inputter to the computer, and in response to disconnection of the communication path, accepting training of the operation of the operator by using the inputter.

* * * * *